United States Patent [19]
Swindler et al.

[11] Patent Number: 5,991,838
[45] Date of Patent: Nov. 23, 1999

[54] MOTORIZED PORTABLE COMPUTER/ EXPANSION CHASSIS DOCKING SYSTEM

[75] Inventors: Dan E. Swindler, Round Rock; Pearce R. Jones, Austin; Mark B. Penniman, Austin; John P. Busch, Austin; Thomas Shu, Austin; Thomas J. Kocis, Austin; Michael D. Durkin, Austin; Orin Ozias, Austin, all of Tex.; Derek Westmoreland, Columbus, Ind.

[73] Assignee: Dell USA, L.P., Round Rock, Tex.

[21] Appl. No.: 08/164,076

[22] Filed: Feb. 17, 1994

Related U.S. Application Data

[63] Continuation of application No. 08/000,858, Jan. 5, 1993, Pat. No. 5,313,596.

[51] Int. Cl.$^6$ .................................................. G06F 13/00
[52] U.S. Cl. .................................... 710/101; 361/683
[58] Field of Search .................. 364/708.1; 395/325, 395/281; 361/686, 683; 710/101, 102, 103

[56] References Cited

U.S. PATENT DOCUMENTS

| | | | |
|---|---|---|---|
| 4,788,658 | 11/1988 | Hanebuth | 364/708.1 |
| 4,903,222 | 2/1990 | Carter et al. | 364/708.1 |
| 5,030,128 | 7/1991 | Herron et al. | 439/372 |
| 5,126,954 | 6/1992 | Morita | 364/708.1 |
| 5,313,596 | 5/1994 | Swindler et al. | 395/325 |
| 5,323,291 | 6/1994 | Boyle et al. | 361/686 |
| 5,477,415 | 12/1995 | Mitcham et al. | 361/868 |

*Primary Examiner*—Glenn A. Auve
*Attorney, Agent, or Firm*—Hayes and Boone, L.L.P.

[57] ABSTRACT

A docking station structure is used to operatively connect a notebook computer to desktop computer peripheral devices. The docking station has an internal receiving chamber into which the portable computer may be manually inserted, an electrical connector positioned within the receiving chamber, a travel plate movably carried within the receiving chamber, a motorized drive system operative to drive the travel plate toward and away from the electrical connector, and a latch structure carried by the travel plate for movement therewith. With the travel plate in a wait position thereof, the portable computer is rearwardly inserted into the receiving chamber. In response to such insertion, the latch structure automatically locks the computer to the travel plate, and the drive system rearwardly moves the travel plate to mate the electrical connector with a corresponding connector on the computer, thereby operatively linking the computer to the peripheral devices. To remove the computer, the drive system is operated to forwardly move the drive plate and the computer to an ejection position in which the computer and docking station electrical connector structures are disconnected from one another, and the computer is unlocked from the travel plate. Upon insertion of the computer into the docking station opposite side portions of the computer are slidingly received in docking station track indentations operative to maintain the computer in a precisely aligned relationship with the docking station electrical connector during driven movement of the computer.

28 Claims, 27 Drawing Sheets

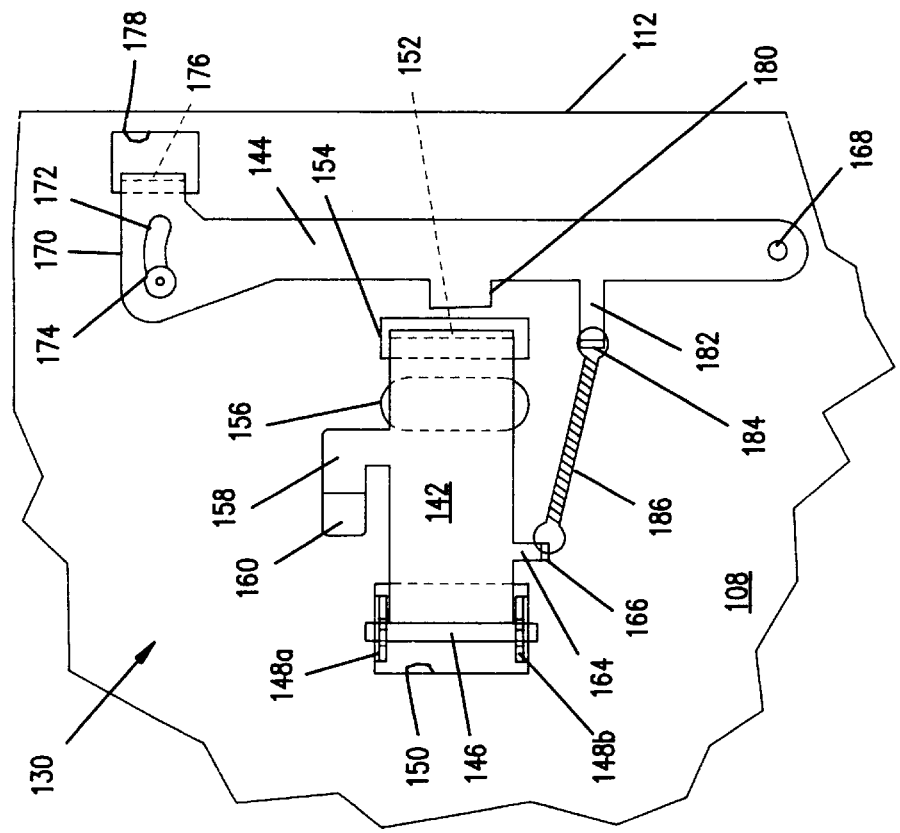
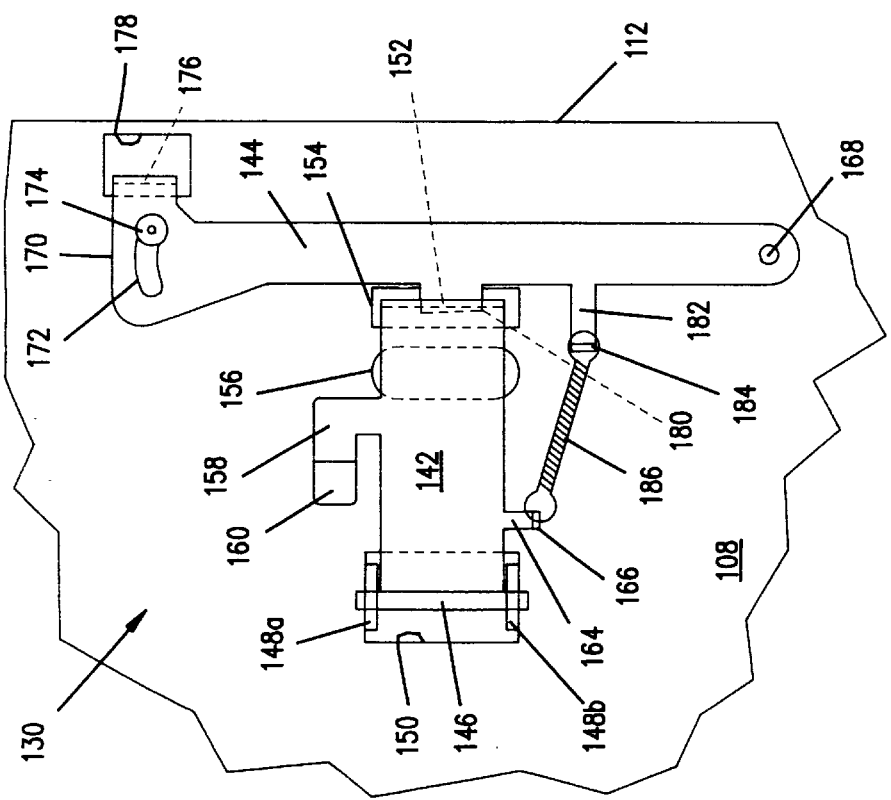

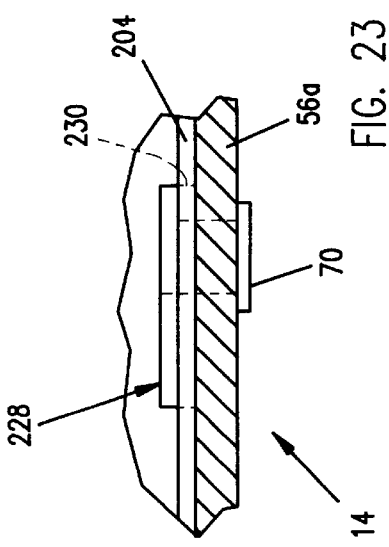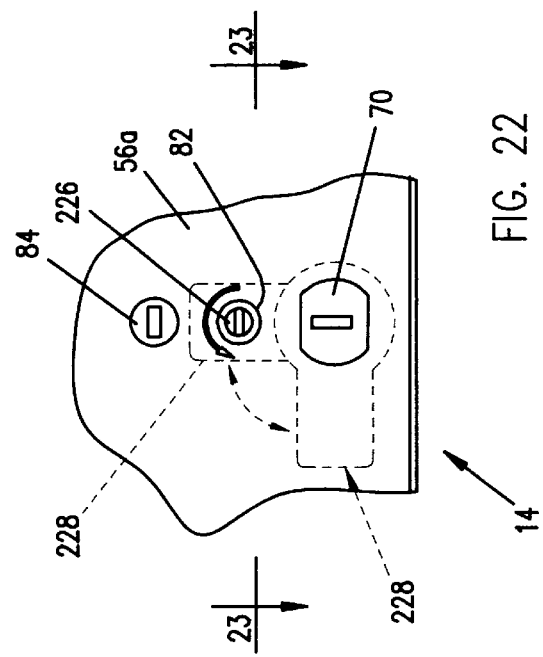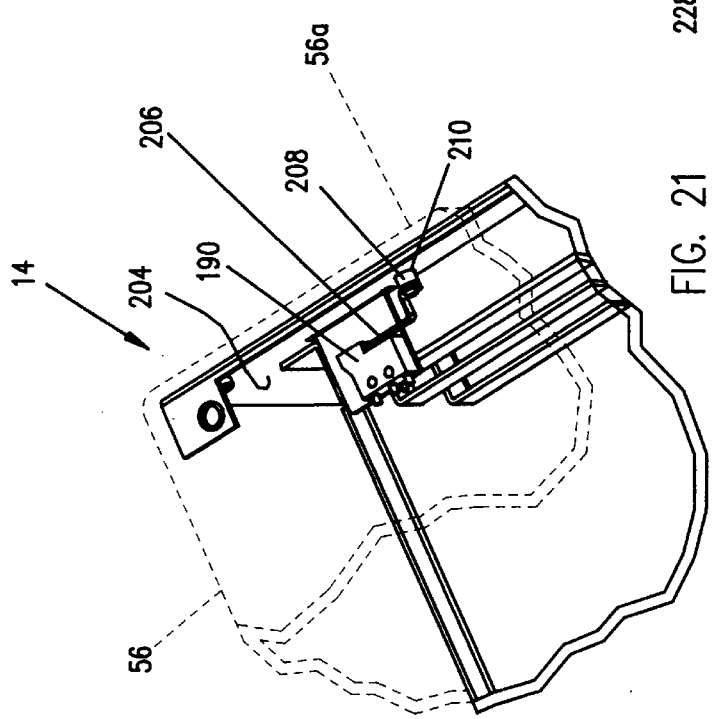

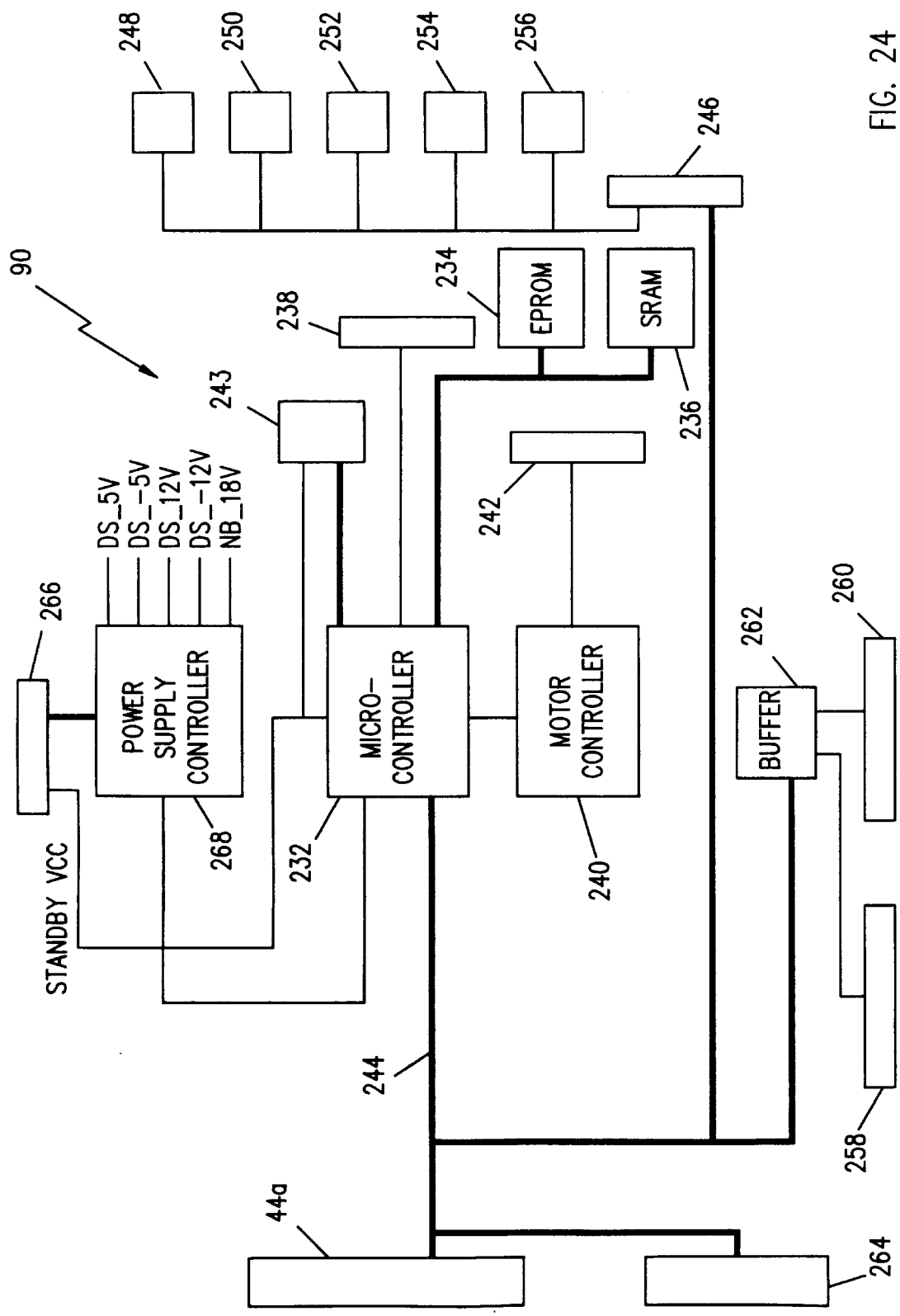

MOTORIZED PORTABLE COMPUTER/EXPANSION CHASSIS DOCKING SYSTEM

This is a continuation of application Ser. No. 08/000,858 filed Jan. 5, 1993 now U.S. Pat. No. 5,313,596.

BACKGROUND OF THE INVENTION

The present invention relates generally to computer apparatus and, in a preferred embodiment thereof, more particularly relates to a motorized docking structure used to releasably receive a notebook computer and operably connect it to desktop computer peripheral equipment such as a monitor, keyboard and mouse.

Portable, battery-powered notebook computers have become increasingly popular over the last several years due to their light weight and small size that permit them to be easily hand-carried in an ordinary briefcase and used by business travelers in cramped spaces, such as on airline seat back trays, lacking electrical plug-in facilities. The modern notebook computer typically has incorporated therein both hard and floppy disc drives, a monitor screen built into its lid portion, and a keyboard built into its main body portion. It is thus a fully self-contained computer able to be conveniently used, for at least short periods of time, in situations and locations in which the use of a much larger desktop computer is simply not feasible.

As is well known, however, even state-of-the-art notebook computers have certain limitations and disadvantages, arising from their otherwise desirable diminutive sizes, compared to keyboard of a notebook computer is often considerably less comfortable to use for extended periods of time compared to the more spacious separate keyboards normally provided with desktop computers.

Additionally, to reduce the space requirements for the typical notebook computer keyboard, many of its keys, that would have but a single function on a desktop computer keyboard, are provided with multiple functions which can be confusing to a user switching back and forth between desktop and notebook computers. Moreover, compared to its desktop computer counterpart, the notebook computer monitor typically does not provide its viewer with as sharp a display image. After an extended computing session, this reduction in display clarity can cause the computer user to experience at least some degree of eye strain. Another disadvantage of portable computers is that, due to their small size, they typically do not provide access for expansion cards such as, for example, network, sound, graphics accelerator and multi-media cards which desktop computer units are conventionally configured to receive.

Because of these shortcomings inherent in notebook computers, it is a common practice for their owners to also purchase a desktop computer system for home or office use. A typical scenario for these two-computer owners, after returning home after using their notebook computer on a business trip, is to transfer their files, data, spreadsheets and the like from their notebook computer to their desktop computer and continue working on the initiated project or projects using the larger and more comfortable desktop peripheral equipment such as the external monitor, keyboard and mouse.

The task of effecting this data transfer from a notebook computer to the desktop computer (and vice versa in preparation for a subsequent road trip) is not a particularly convenient one for the computer user. It is typically accomplished by the often time consuming method of (1) inserting a floppy disc into the notebook computer, (2) copying a portion of the data from the notebook computer hard drive onto the inserted floppy disc, (3) removing the floppy disc from the notebook computer, (4) inserting the removed floppy disc into the desktop computer, (5) copying the data from the floppy disc onto the hard drive of the desktop computer, and then (6) repeating steps (1) through (5), as necessary, until all of the desired data is transferred from the notebook computer to the desktop computer.

Alternatively, various software is available for use in a notebook computer to download data therefrom to a desktop computer through a cable interconnected between the serial ports on the notebook and desktop computers. This procedure, while somewhat more convenient than laboriously shuffling floppy discs back and forth between the two computers, has other disadvantages. For example, it requires the additional purchase and installation of the transfer software which occupies space in the notebook hard drive—space which is often at a premium in the relatively small hard drives typically provided in notebook computers.

Moreover, each time data is to be transferred from the notebook computer to the desktop computer, a cable must be interconnected between the two computers and subsequently disconnected. This can be a rather awkward task since the serial port on a desktop computer is typically located on its back side in the midst of a jumble of other cables.

In addition to the inconvenience of these conventional methods of transferring data back and forth between notebook and desktop computers there is, of course, the considerable expense entailed in purchasing two complete computer systems to provide both the compactness and portability of a notebook computer and the greater capacity and use comfort of a desktop computer. Some of this expense may be avoided by purchasing (in addition to the notebook computer) only desktop computer peripheral equipment—such as a monitor, keyboard, mouse and external hard drive—for home or office use.

When the user works at his home or office station he connects the notebook computer to the desktop computer peripheral equipment, using the necessary interconnect cables, to fashion a hybrid computer system utilizing the notebook computer CPU in conjunction with the desktop computer peripheral devices. While this alternative approach is less expensive than purchasing two complete computer systems, it is highly inconvenient due to the number of cables that must be connected between the notebook computer and the desktop peripherals, to "construct" the hybrid system, and later be disconnected to free the notebook computer for travel use. Additionally, the jumble of interconnect cables sprawling across the desk or table area creates a decidedly disorderly and unattractive work station.

In response to these problems and inconveniences, interconnect structures commonly referred to as "docking stations" have been previously proposed. A docking station is basically a housing structure, considerably larger than a notebook computer and designed to be left in place on a home or office desktop, to which the notebook computer may be removably connected by releasably interengaging mating plug and socket portions fixedly secured to the notebook computer and the associated docking station.

The docking station is typically connected to external desktop peripheral devices, such as a monitor, keyboard and mouse, that remain in place on the desktop work station. Disposed within the docking station housing are various components that serve to operatively connect the notebook computer to these desktop peripheral devices when the notebook computer is plugged into the docking station. However, the docking station is not provided with a central processing unit. Instead, when the notebook computer is "docked" in this manner, its central processing unit is utilized in the resulting desktop computer work station and the desktop keyboard, monitor and mouse are used in any subsequent desktop computing tasks. After these tasks are completed, the notebook computer can simply be unplugged from the docking station and carried away for use of the removed notebook computer in its usual self-contained mode.

Compared to the previous necessity of purchasing a complete desktop computer system in addition to a notebook computer, the use of this docking station concept provides several distinct advantages. For example, since the docking station is not furnished with its own central processing unit (using, in place thereof, the notebook computer CPU) the overall cost of providing both portable and home or office-based computer work stations is substantially reduced.

Additionally, the previous inconvenience of transferring data from the notebook computer to the desktop system is essentially eliminated since the requisite notebook/desktop computer interface for this data transfer is achieved simply by plugging the notebook computer into the docking station (which may have an internal hard drive or be connected to an external hard drive) without the need for switching floppy discs back and forth or using an external interconnection cable. Moreover, from a connection convenience standpoint, the use of the plug-in docking station is clearly preferable to laboriously connecting the notebook computer directly to desktop peripheral devices using several separate interconnect cables.

Despite their cost reduction and convenience advantages, previously proposed docking stations have tended to have certain problems associated therewith relating to their physical connection to the associated notebook computer. For example, since the relatively small plug-in interface between the docking station and the notebook computer must effect a multitude of electrical connections between the internal operating components in the notebook computer and the docking station housing, mating high density pin connector structures (one on the notebook computer and one on the docking station) are typically used to provide the plug-in computer/docking station mechanical interconnection.

A typical method of creating this interconnection is to place the notebook computer on the docking station, with the mating pin connectors in a facing, spaced apart relationship with one another, and then manually pushing the notebook computer toward the docking station connector pin structure to create the plug-in connection. The need to precisely align the facing connectors, coupled with the high mating force requirement associated with these high density pin connectors, typically requires that this manual connection task be carefully and precisely performed to avoid potential damage to the connector pin structures. The same care must be exercised, and a considerable amount of manual force exerted, in disconnecting the notebook computer from the docking station to avoid connector pin damage.

Manual latching mechanisms have been proposed to exert a mechanically advantaged connection force on the notebook computer and to hold the docked computer in place on the expansion chassis. These latching systems are typically operated by placing the notebook computer on the docking station in a spaced relationship with the docking station connector structure and then pivoting a latch structure against the computer to drive its connector pin structure into mating engagement with the docking station connector pin structure. While this reduces the manual mating force that needs to be exerted, connector pin structure alignment problems can still arise if care is not exercised. Additionally, a high manual force is still required to subsequently unplug the notebook computer from the docking station.

Another problem typically associated with conventional manually operable docking station systems is that is possible to dock the portable computer while the computer is on and the docking station is off, or vice versa. This creates, in either situation, a voltage mismatch between the mating computer and docking station electrical connector structures that can damage the input buffers in the computer or docking station as the case may be.

It can be seen from the foregoing that it would be desirable to provide a portable computer/expansion chassis docking system having improved computer docking and undocking apparatus and methods. It is accordingly an object of the present invention to provide such a system.

SUMMARY OF THE INVENTION

In carrying out principles of the present invention, in accordance with a preferred embodiment thereof, a motorized portable computer/docking station system is provided which includes a portable computer, preferably a notebook computer, having first operating components therein, and a first electrical connector structure disposed on a rear side of thereof and connected to the first operating components. The system also includes a docking station having a housing portion in which second operating components are disposed, these second operating components being operatively connectable to external desktop computer peripheral devices such as a monitor, keyboard and mouse.

The portable computer is manually insertable rearwardly into an internal receiving structure within the docking station housing, the receiving structure having a second electrical connector structure supported in a rear portion thereof and operatively engageable with the first electrical connector structure to operatively link the first operating components in the portable computer to the second operating components within the docking station housing, thereby operatively linking the portable computer to the desktop computer peripheral devices to which the docking station is connected.

A travel member is carried within the internal receiving structure for forward and rearward movement therein relative to the docking station housing between (1) a receiving position in which the travel member is spaced forwardly apart from the second electrical connector structure, (2) a docking position rearwardly shifted relative to the receiving position, and (3) an ejection position forwardly shifted relative to the receiving position. Motor means are provided for driving the travel member between its receiving, docking and ejection positions, with the operation of the motor means being regulated by an electromechanical control system.

In response to manual rearward insertion of the portable computer into the internal receiving structure with the travel member in its receiving position, latch means carried on the travel member for movement therewith function to lock the computer to the travel member, and the control system energizes the motor means to drive the travel member from its receiving position to its docking position. This, in turn, docks the computer by forcibly interengaging the first and second electrical connector structures to thereby connect the first operating components to the second operating components and thus to the desktop computer peripheral devices to which the docking station is connected. During rearward driven movement of the computer toward the second electrical connector, cooperating alignment means on the computer and the internal receiving structure function to maintain a precisely aligned relationship between the first and second electrical connector structures.

When it is desired to remove the inserted portable computer from the docking station, the motor means are operated to forwardly drive the travel member from its docking position to its ejection position. During this forward movement of the travel member, cooperating means on the internal receiving structure and the latch means function to unlock the computer from the travel member to permit a rear portion of the travel member to drive the computer to the travel member ejection position to facilitate removal of the computer from the internal receiving structure. The motor means are then automatically operated to return the travel member to its receiving position, thereby readying it for another driven docking and undocking cycle.

In a preferred embodiment of the docking station, the travel member is provided with a pre-docking calibration cycle. Prior to start-up of the docking station, the travel member, for one reason or another, may be positioned slightly forwardly or rearwardly of its receiving position. Accordingly, when the docking station is initially energized prior to the manual insertion therein of the portable computer, the control system operates the motor means (preferably an electric stepper motor) to forwardly drive the travel member to a calibration position, such calibration position representatively corresponding to the ejection position of the travel member. When the attainment of the travel member calibration is sensed by the control system the motor means are operated to rearwardly drive the travel member precisely back to its receiving position to ready the docking station for operative receipt of the portable computer.

To permit the motor means to be manually rotated to eject the computer in the event that the motorized drive system becomes jammed or otherwise inoperative, the motor means drive shaft is provided with a slotted end portion accessible with a screwdriver through aligned access openings in the docking station housing and an interior chassis wall portion of the docking station.

Additionally, the docking station housing is preferably provided with a removable top cover portion through which one of the aligned access openings extends. To selectively prevent removal of this top cover portion, a chassis locking system is provided and includes a locking opening formed in the chassis wall portion, and a locking member disposed inwardly of the locking opening and secured to the removable housing cover portion. The locking member is key-rotatable between a first position in which outward removal of the locking member through the locking opening is precluded and the locking member blocks tool insertion inwardly through the aligned access openings, and a second position in which the locking member permits such tool insertion and may be moved outwardly through the locking opening to permit removal of the top housing cover portion.

The electromechanical control system regulates the operation of the motor means, and provides other control functions, using various detect switches including a cover detect switch; notebook power-on and notebook detect switches; a PCMCIA door detect switch; an I/O door detect switch; a zero position detect switch; a latch means detect switch; and a loopback detect switch.

The cover detect switch functions to prevent operation of the motor means in the event that the aforementioned top housing cover portion of the docking station is removed. This switch is positioned within the docking station housing to be contacted by a portion of the housing cover portion when it is installed. When the switch is so contacted, it permits operation of the motor means. Conversely, when such contact is terminated by removal of the housing cover portion, the cover detect switch precludes operation of the motor means.

The notebook detect switch is positioned to be contacted by the notebook computer upon its insertion into the docking station internal receiving structure, and the notebook power-on detect switch photoelectrically senses the energization or non-energization of a "power on" indicating light on the computer during docking of the computer. These two switches cooperate to prevent operation of the motor means to rearwardly drive the travel plate if the notebook computer is not inserted into the docking station or, if so inserted, is turned on.

In a preferred embodiment thereof, the notebook computer has a pair of PCMCIA card slots in a side portion thereof. With the computer docked within the docking station, these slots are inwardly aligned with a card insertion opening in the docking station housing. Associated with this housing opening is a sliding door plate that may be moved between a closed position in which it covers the housing card insertion opening, and an open position in which it uncovers such opening.

Accordingly, when the computer is docked and the door plate is opened, PCMCIA cards may be operatively inserted into the docked computer through the aligned housing card insertion opening and the computer card slots. The PCMCIA door detect switch functions to detect the opening of the door plate and responsively prevent the travel member from being driven from its docking position to its ejection position. This serves to prevent damage to PCMCIA cards that are inserted into the docked computer and project outwardly through the housing card insertion opening.

The portable computer is preferably provided on its rear side with an I/O port structure recessed in an opening provided with a sliding I/O door plate movable between an open position in which it covers the I/O port opening, and a closed position in which it covers such opening. When the computer is manually inserted into the internal receiving structure with its I/O door properly opened, and the travel member is rearwardly driven toward its docking position, a deflectable plate member secured to a rear wall portion of the internal receiving structure enters the I/O port opening and contacts and electrostatically discharges the I/O port structure prior to the operative docking of the computer.

However, if the I/O door is closed, the deflectable plate member contacts the closed door and is driven into engagement with the I/O door detect switch without electrostatically discharging the I/O port structure. When so engaged, the I/O door detect switch functions to terminate further rearward movement of the travel plate, prior to docking of the computer, in a manner preventing contact between the aforementioned first and second electrical connector structures.

The zero position detect switch is carried on a bottom wall portion of the internal receiving structure and is positioned to be contacted by a portion of the latch means when the travel member is moved to its calibration position. In response to such contact, the zero detect switch causes the motor means to drive the travel member rearwardly back to its receiving position.

The latch means detect switch is carried on the travel member and operates to sense the movement of the latch means from an unlocking position thereof to a locking position thereof, created by manual insertion of the portable computer into the internal receiving structure with the travel member in its receiving position, and responsively cause the motor means to rearwardly drive the travel member from its receiving position toward its docking position. The latch means detect switch also cooperates with the notebook detect switch to prevent the rearward driving of the travel member toward its docking position absent a prior manual insertion of the portable computer into the internal receiving structure.

The loopback detect switch functions to determine whether the first electrical connector structure of the portable computer, as a result of the computer being driven with the travel member to the docking position thereof, has been operatively engaged with the second electrical connector structure.

In addition to the detect switches described above, the electromechanical control system further includes processor means which control the operation of the motor means for selective rearward or forward driving of the travel member based upon conditions within the docking station. Conditions which may affect the processor means control of the motor means and which are detected by the aforementioned switches include the removal or improper installation of the top housing cover portion of the docking station, detection of the portable computer within the internal receiving structure of the docking station, the position of the latch means used for locking the computer to the travel means, the position of the travel means within the internal structure of the docking station, premature energization of the portable computer, the positioning of the I/O door of the portable computer, the positioning of the PCMCIA door of the docking station, and the presence of an operative engagement of electrical connector structures of the portable computer and the docking structure.

Certain ones of these conditions and the sequence in which these conditions are detected may affect the processor means control of the motor means during reset, docking and/or ejection procedures. Detection of the removal of the top housing cover portion affects the reset, docking and ejection procedures. The position of the latch means and travel member within the internal receiving structure affects both the ejection and reset procedures. Detection of the portable computer, the position of its I/O door and its energization state affect only the docking procedure. Position of the PCMCIA door affects only the ejection procedure.

The processor means further includes means for controlling the power modes of both the portable computer and the docking station to maintain proper system operation. If energized, the portable computer cannot be docked when energized and components of the docking station not utilized during the docking procedure are not energized until after docking is complete. Likewise, the processor means will de-energize the portable computer if the ejection procedure is initated while the portable computer is energized.

BRIEF DESCRIPTION OF THE DRAWINGS

FIGS. 19A and 19B are enlarged scale bottom plan views of a portion of the travel plate respectively illustrating the components of its latch mechanism in their FIG. 18A and 18B positions;

FIG. 21 is an enlarged scale partially phantomed perspective view of a left rear corner portion of the docking station and illustrates a cover detector switch used to disable travel plate movement while the docking station top housing portion is removed;

FIG. 22 is an enlarged scale elevational view of the circled rear side docking station area "A" in FIG. 5 and illustrates, in phantom, a chassis locking mechanism incorporated in the docking station;

FIG. 23 is a schematic cross-sectional view, taken along line 23—23 of FIG. 22, through a rear side portion of the docking station and further illustrating the chassis locking mechanism;

FIG. 24 is a simplified block diagram of a system planar board, installed in the docking station illustrated in FIGS. 1, 5–19B and 21–23, for operatively engaging the notebook computer illustrated in FIGS. 2–4 therewith;

Figure 1:
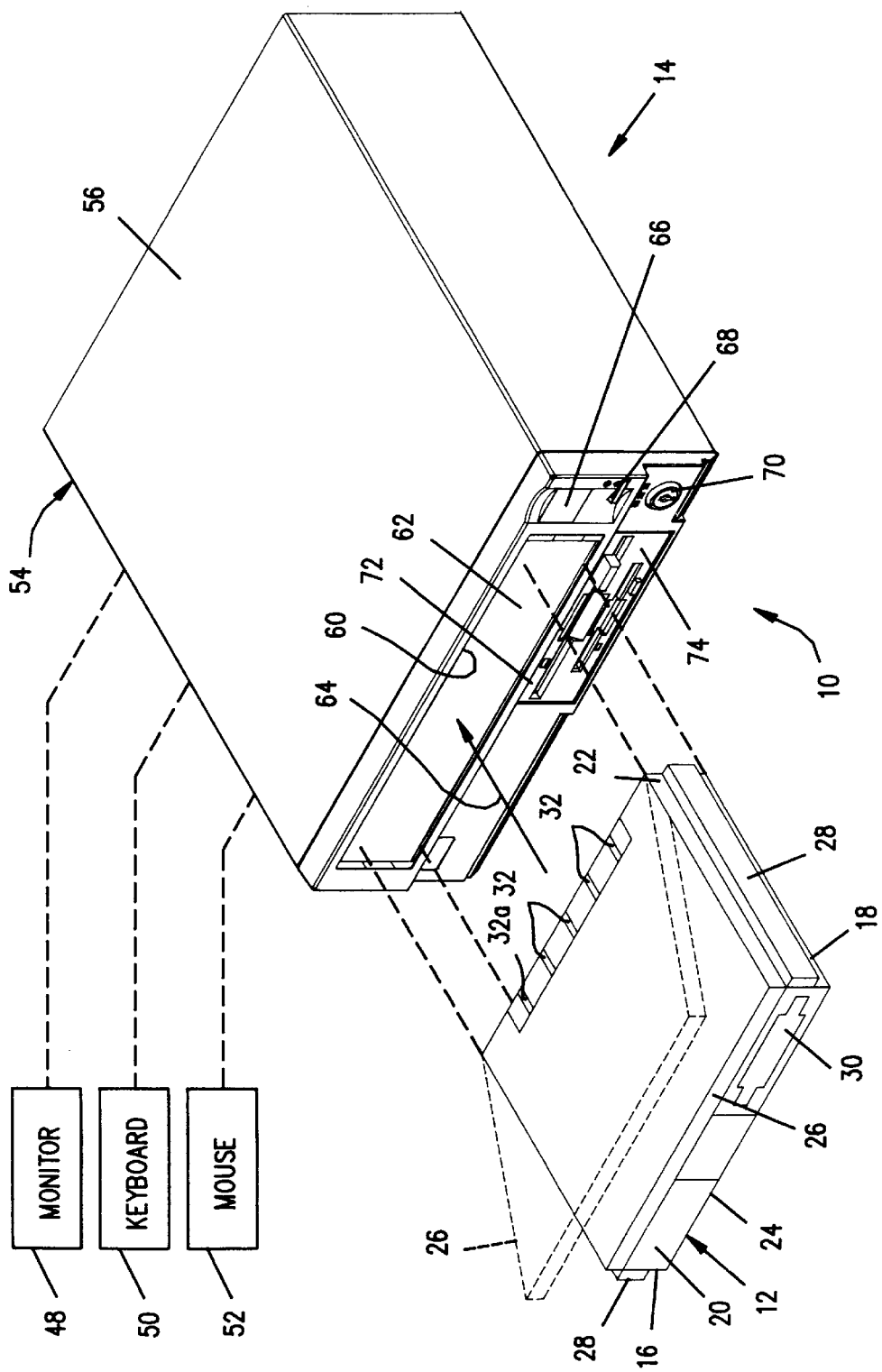
FIG. 1 is a somewhat simplified front and right side partially exploded perspective view of a specially designed notebook computer, and an associated expansion chassis docking station, embodying principles of the present invention.

DETAILED DESCRIPTION
Structure of the Docking Station and Portable Computer

Referring initially to FIGS. 1-5, the present invention provides a specially designed portable computer/expansion chassis docking system 10 including a notebook computer 12 and a docking station structure or expansion chassis 14, hereinafter referred to simply as the "docking station." Notebook computer 12 is of a relatively thin rectangular configuration and has a body portion with left and right sides 16 and 18, front and rear sides 20 and 22, and a bottom side 24.

Pivotally secured to the top side of the computer body portion is a rectangular lid 26 which, as indicated in phantom in FIG. 1, may be pivoted upwardly in the usual manner to expose a keyboard (not shown) on the top side of the computer body, and a display screen (also not shown) on the underside of the lid 26. For purposes later described, a pair of generally rectangularly configured guide rails 28 longitudinally extend along the left and right side walls 16 and 18 and laterally project outwardly therefrom. Additionally, a pair of downwardly pivotable support legs 29 are secured to the bottom side 24 of the computer 12 adjacent its rear edge.

In a conventional manner, the notebook computer 12 has a variety of internally mounted operating components (not illustrated) including a hard drive, a floppy drive having a disc insertion slot 30 on the front side 20 of the computer body, and a motherboard. At the back edge of the lid 26 are a series of LED indicating lights 32 (see FIG. 1) including a "power on" indicating light 32a.

Figure 2:
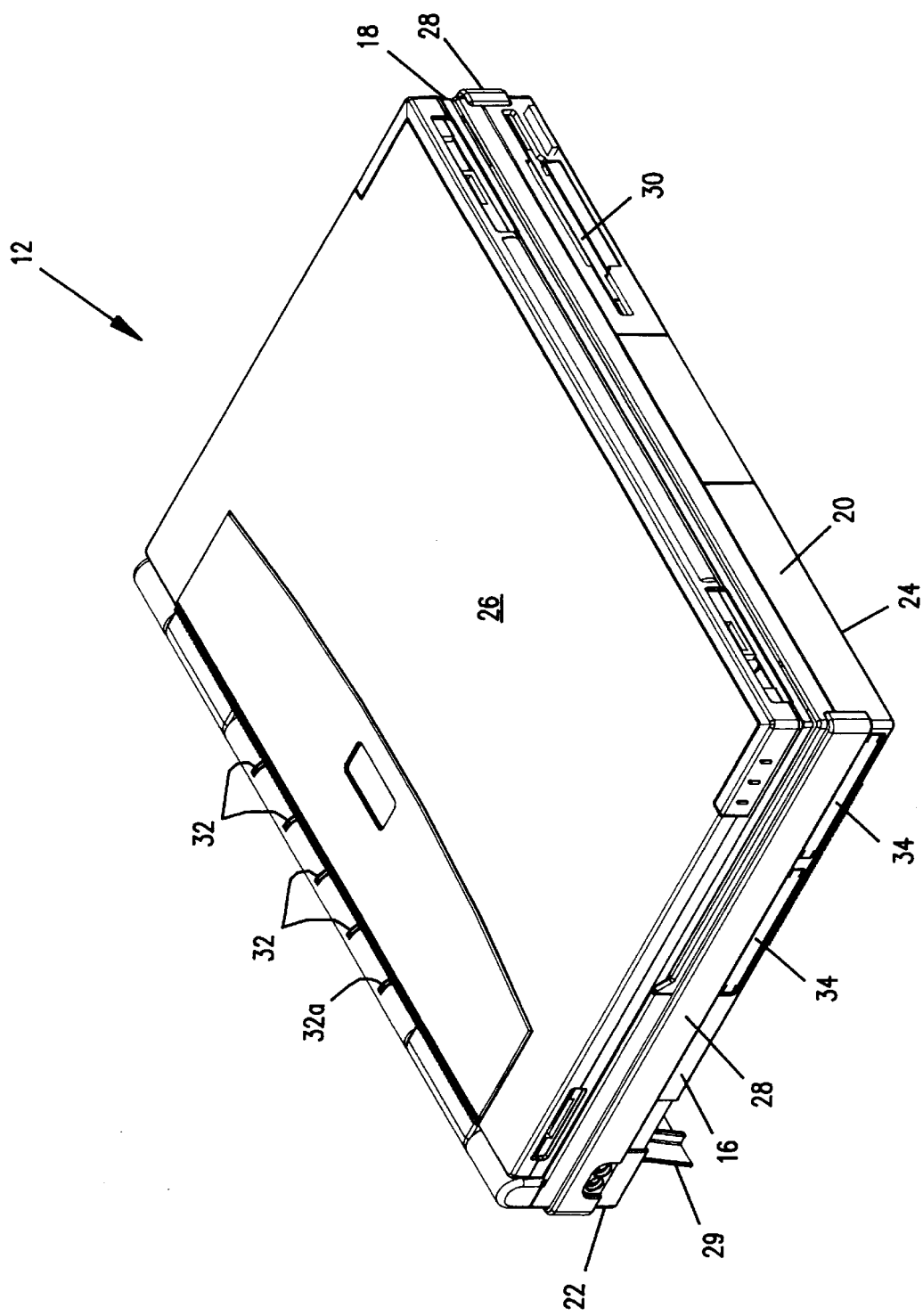
FIG. 2 is an enlarged scale front,left and top side perspective view of the notebook computer.
Figure 4:
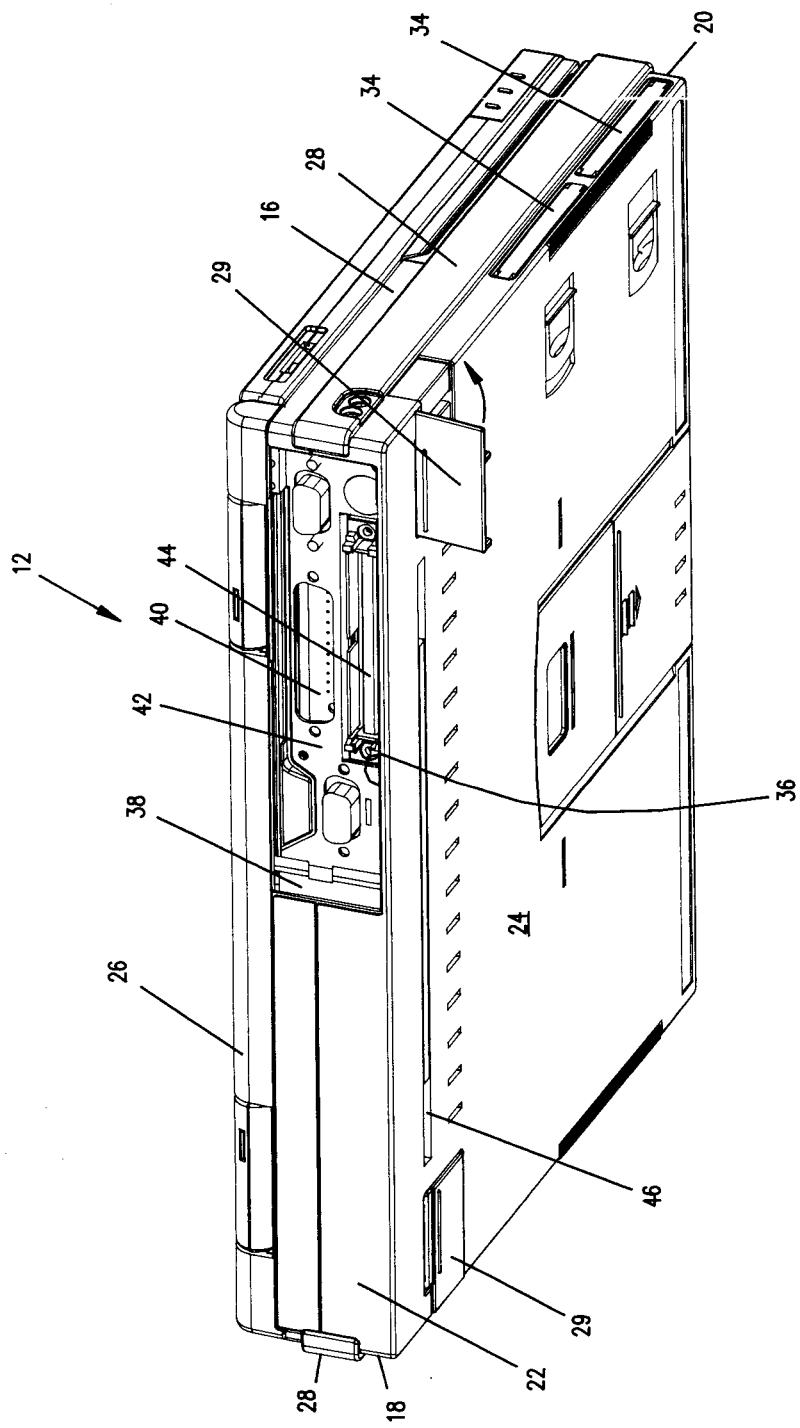
FIG. 4 is an enlarged scale rear, left and bottom side perspective view of the notebook computer.

As shown in FIGS. 2 and 4, a pair of slots 34 are formed through the left side 16 of the computer body. PCMCIA (Personal Computer Memory Card International Association) cards may be inserted through the slots 34 and removably connected to corresponding operating circuitry within the computer body.

Figure 3:
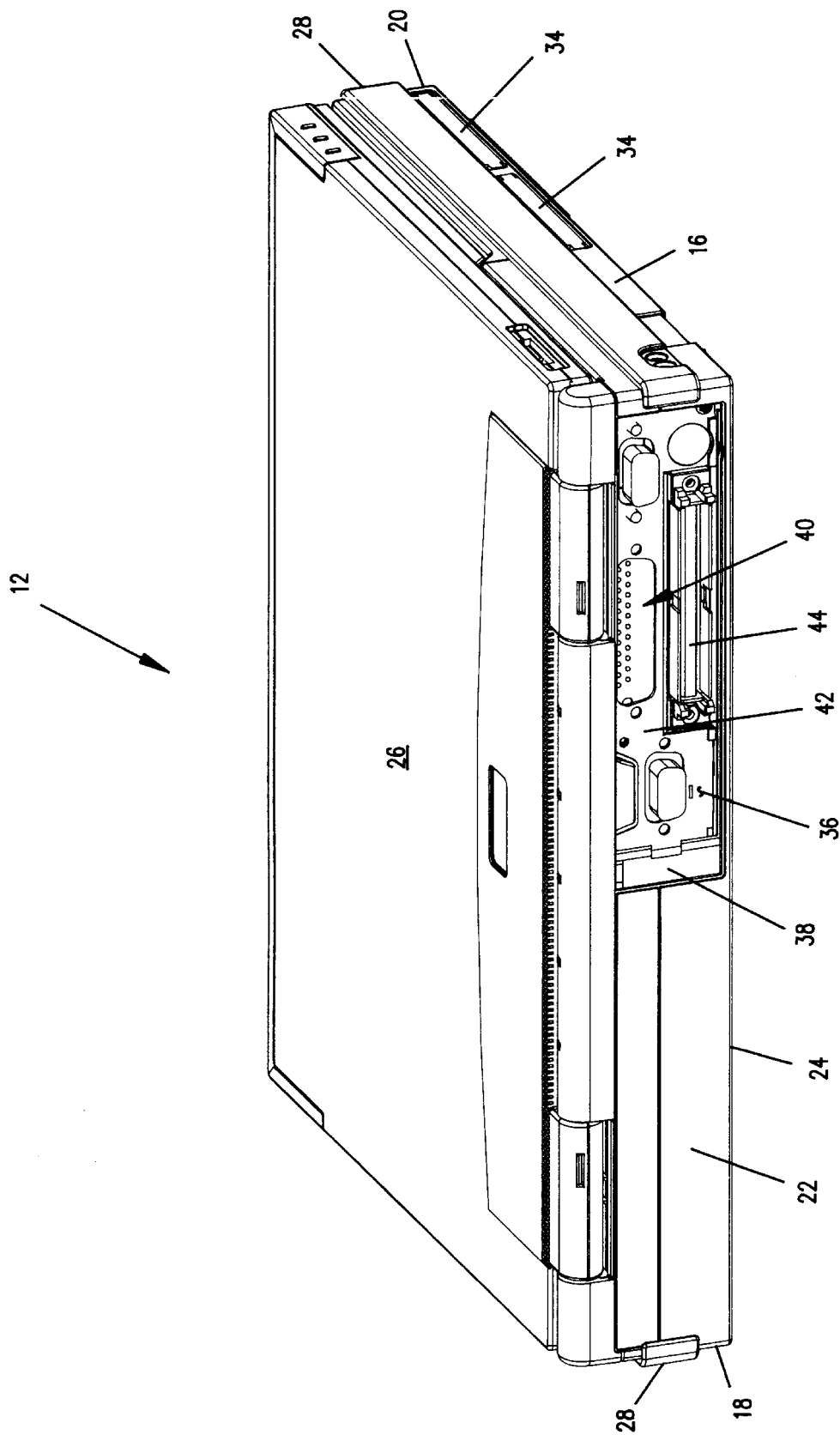
FIG. 3 is an enlarged scale rear, left and top side perspective view of the notebook computer.

Referring now to FIGS. 3 and 4, a rectangular opening 36 is centrally formed in the back side 22 of the computer body. A rectangular door plate 38 is slidably affixed to the back computer body side 22 and may be horizontally moved between its illustrated open position in which it uncovers the opening 36, and a closed position (achieved by sliding the door plate 38 to the right as viewed in FIGS. 3 and 4) in which it covers the opening. When the door plate 38 is opened, the opening exposes a recessed I/O port structure 40 having a metal plate portion 42 inwardly adjacent the opening 36.

Recessed into the rear computer body side 22, within the opening 36 and below the I/O port structure 40, is a high density male electrical pin type connector section 44. For purposes later described, an indentation 46 (FIG. 4) is formed in the bottom side 24 of the computer adjacent its left rear corner.

Figure 5:
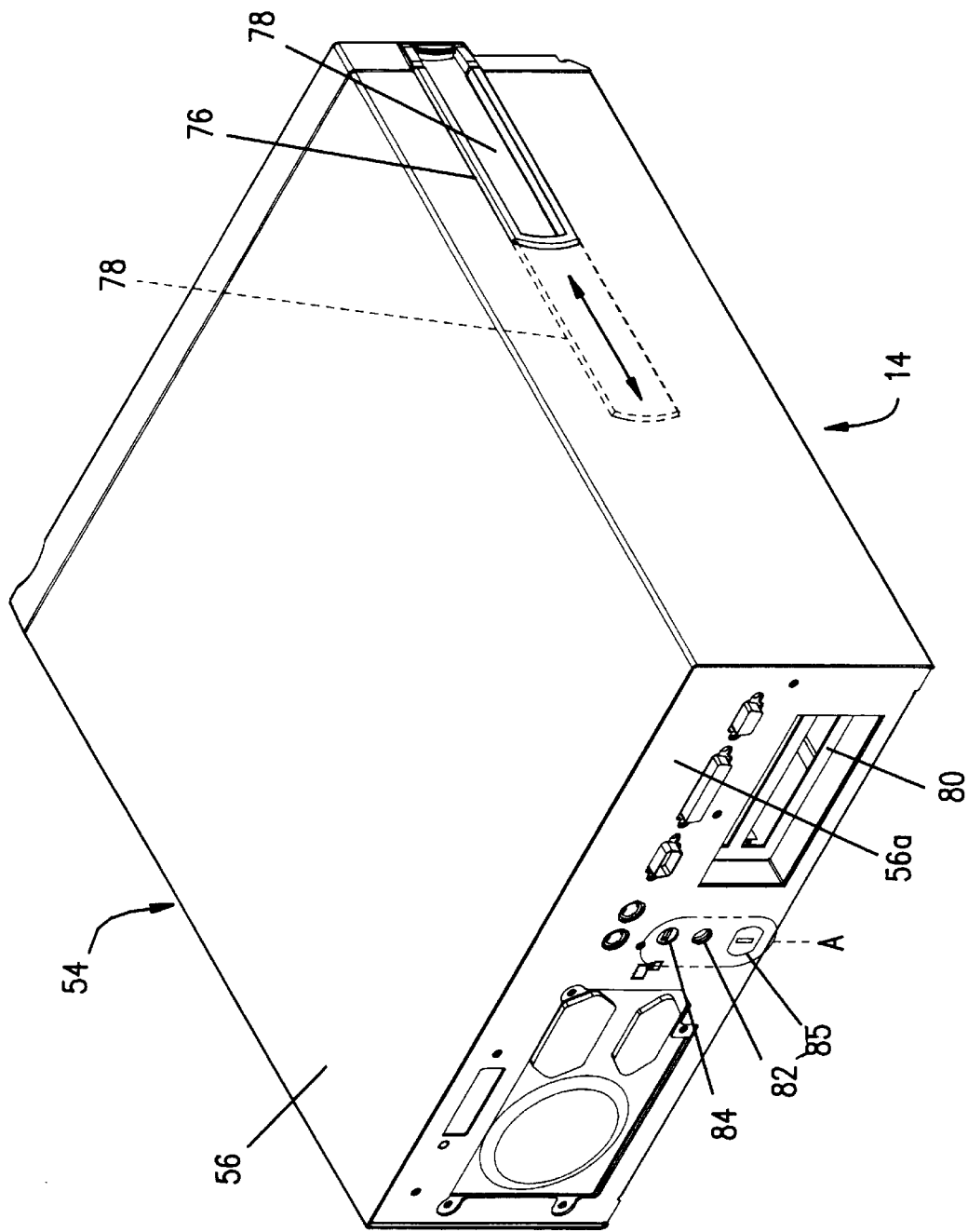
FIG. 5 is a rear and left side perspective view of the docking station.
Figure 6:
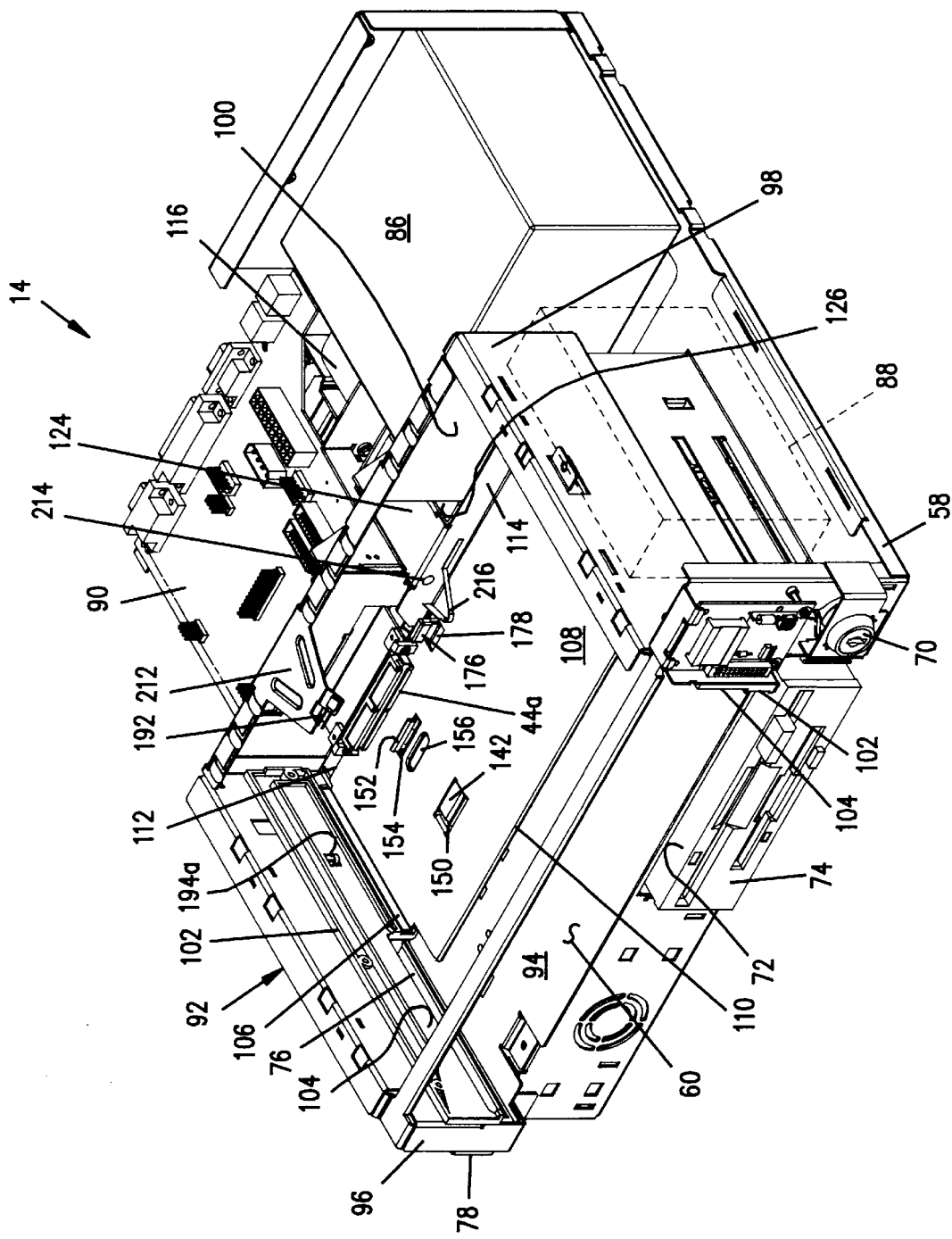
FIG. 6 is an enlarged scale, partially phantomed front and right side perspective view of the docking station with a top portion of its housing removed.

Turning now to FIGS. 1, 5 and 6, the docking station 14 is considerably larger than the notebook computer 12, has a rectangular configuration, and is adapted to rest on the table or desk portion of a home or office computer work station. As schematically depicted in FIG. 1, the docking station is representatively connected to conventional external desktop computer peripheral devices such a monitor 48, a keyboard 50 and a mouse 52. Docking station 14 includes a housing 54 having a top cover portion 56 which is removable from a bottom wall portion 58 of the housing to expose the operating components within the docking station.

Extending along the front side of the docking station 14 (see FIG. 1) is a horizontally elongated rectangular opening 60 which is normally covered by a door plate 62. Door plate 62 is connected along its lower side edge to the docking station for downward and rearward pivotal motion into the interior of the docking station, and is spring-biased toward its upright position, shown in FIG. 1, in which it covers the opening 60.

The notebook computer 12 is rearwardly insertable into the docking station 14 through the opening 60 as indicated by the arrow 64 in FIG. 1. In a manner subsequently described, a motorized drive system within the docking station 14 operates in response to this manual insertion of the notebook computer to further translate it and automatically connect it to peripheral devices such as the external peripheral devices 48,50 and 52 through circuitry in the docking station 14. The motorized drive system is also selectively operable to drivingly eject the inserted computer outwardly through the opening 60 and automatically disconnect it from the docking station.

Immediately to the right of the pivotable door plate 60 are a display window 66, for example, a four character LCD display, in which various docking station operating indicia of the docking station are automatically displayed, an "on/off/eject" switch 68, and a key lock 70 for the docking station. Exposed beneath the door plate 62 are the front ends of a 3.5" floppy disc drive 72 and a 5.25" floppy disc drive 74.

Turning now to FIG. 5, adjacent its front end the left side of the top cover portion 56 of the docking station housing 54 has a horizontally elongated opening 76. Slidingly supported at the opening 76 is a horizontally elongated door plate 78 that may be moved between its solid line closed position and dotted line open position in which it respectively covers and uncovers the opening 76. With the notebook computer 12 inserted into the docking station 14 and operatively connected to the peripheral devices 48,50 and 52, the notebook computer slots 34 (FIG. 2) face and are aligned with the docking station opening 76. Accordingly, when the door plate 78 is opened and the aligned opening 76 and slots 34 are thus uncovered, PCMCIA cards may be operatively inserted into the notebook computer from outside the docking station through the opening 76. On the back side of the docking station 14 are an expansion bay structure 80, a circular motor access opening 82, a locking structure 84 to which one end of an anti-theft security cable may be secured, and a keylock portion 85 of a subsequently described chassis locking system.

Figure 7:
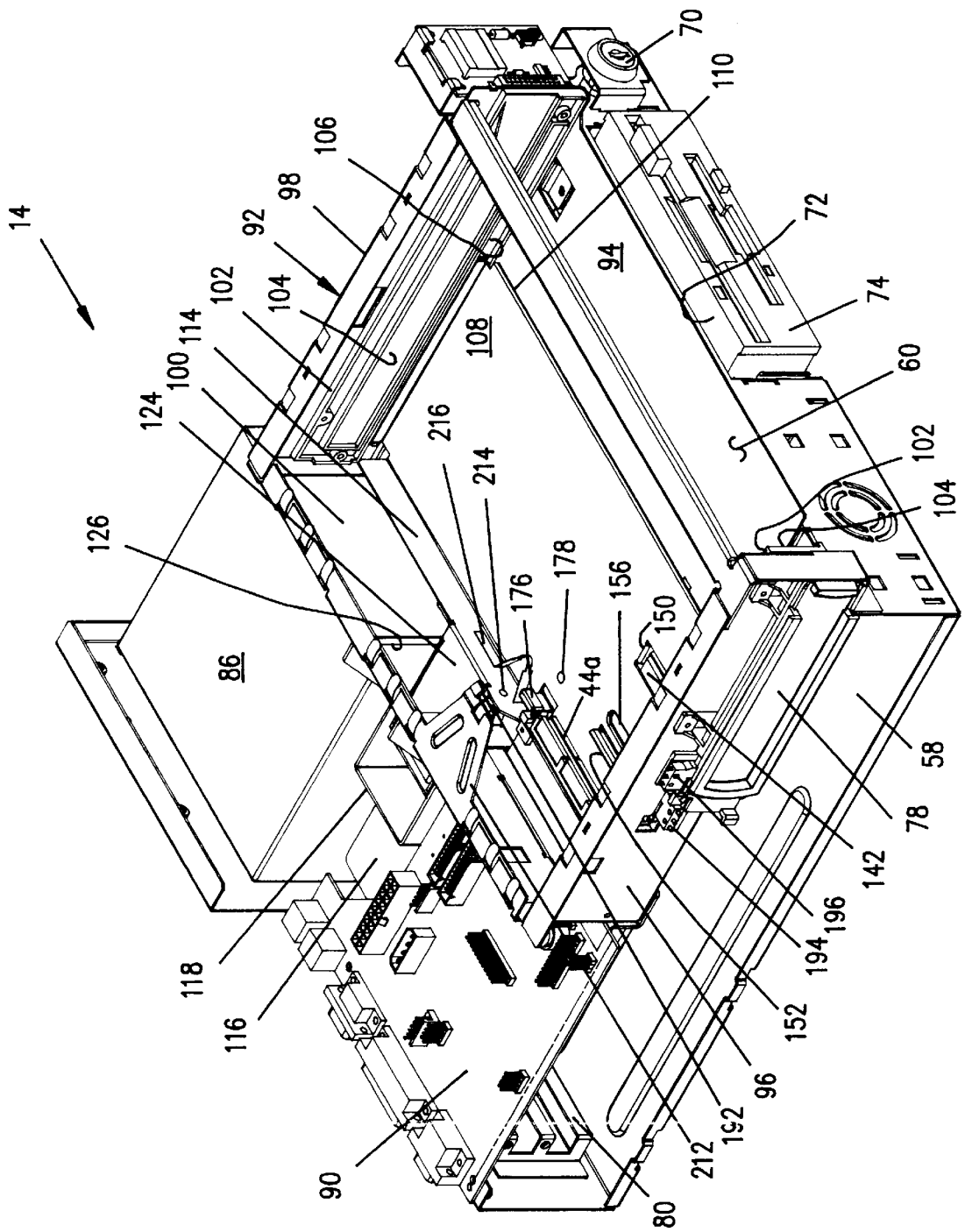
FIG. 7 is an enlarged scale front and left side perspective view of the docking station with a top portion of its housing removed.
Figure 8:
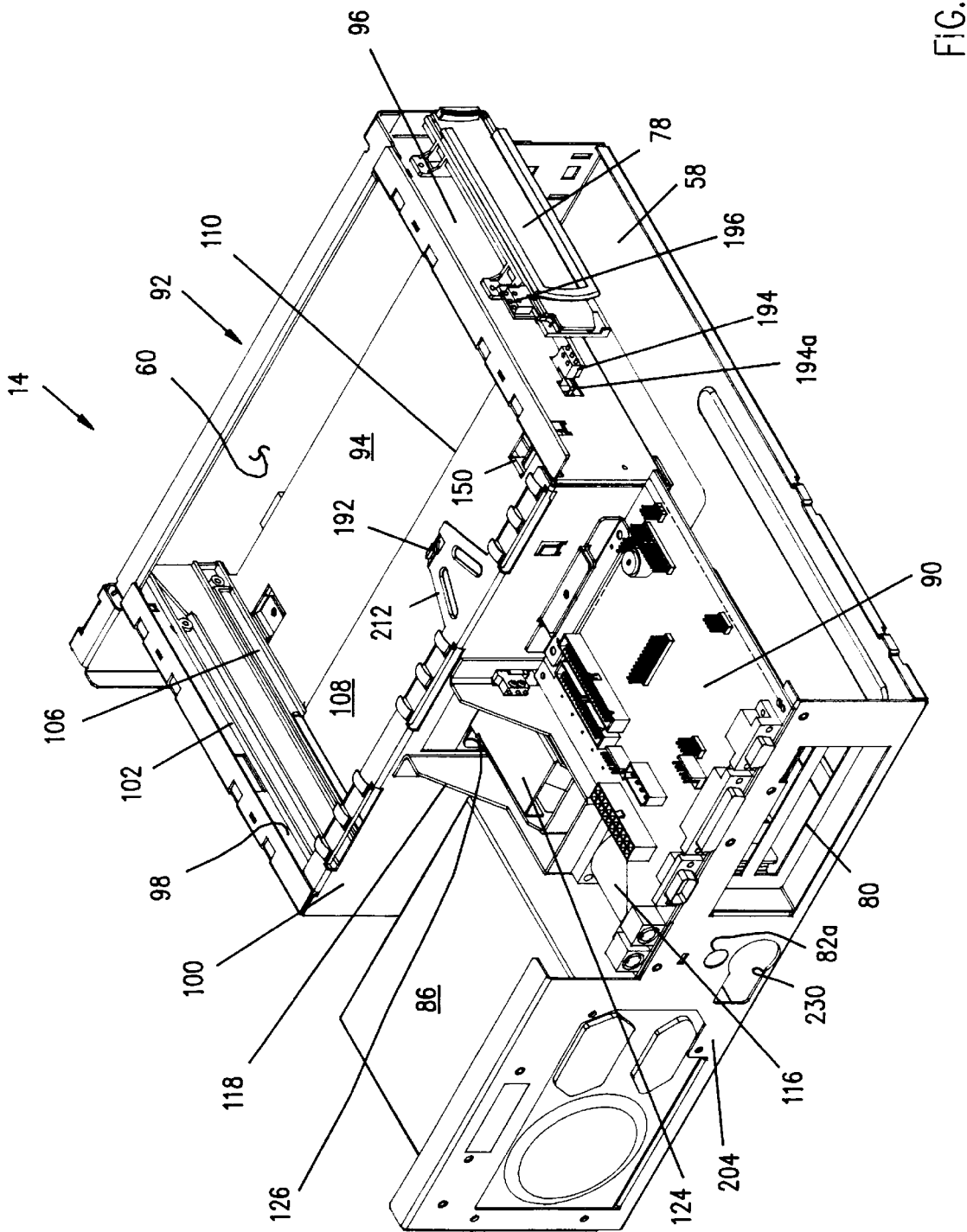
FIG. 8 is an enlarged scale rear and left side perspective view of the docking station with a top portion of its housing removed.

FIGS. 6–8 illustrate the docking station 14 with its top housing cover portion 56 removed from the bottom housing wall 58 to expose the internal operating components of the docking station. These operating components include the previously mentioned floppy disc drives 72 and 74, a power supply unit 86, a hard disc drive 88 shown in phantom in FIG. 6, and a system planar board 90.

As opposed to the motherboard normally incorporated in a computer (such as the motherboard in the notebook computer 12), the planar board 90 does not provide full computer processing control. It is thus considerably simpler, smaller and less expensive than the usual desktop motherboard and functions instead, in a manner subsequently described herein, merely to control the operation of the previously mentioned motorized docking system, control the energization of the notebook computer 12 and selected operating components of the docking station 14 to prevent potentially damaging voltage mismatches, provide an operative interface between the internal operating components in the docking station and notebook computer, and link the docked notebook computer to the docking station drives 72,74,88 and the external peripheral devices 48,50 and 52.

Accordingly, the overall cost of the desktop portion of the system 10 is considerably reduced compared to a conventionally constructed desktop computing system. When the notebook computer 12 is operatively disposed within the docking station 14, the resulting desktop computing system utilizes the notebook computer motherboard as its main processing circuitry and permits the use of the desktop peripheral devices in place of the corresponding components on the notebook computer. The user is thus provided with the advantages of both a notebook computer and a desktop computer system at a considerable reduction in cost.

Also incorporated in the docking station 14 is a specially designed docking tray subassembly 92 (FIGS. 6–8) which is shown removed from the docking station in FIGS. 9–17. Subassembly 92 defines within the docking station 14 a receiving area in the form of an internal chamber into which the notebook computer 12 may be inserted, and includes a hollow rectangular tray structure having open front and top sides, a bottom tray wall 94, opposite upstanding left and right end walls 96 and 98, and an upstanding rear side wall 100 to which the planar board 90, a part of the removable subassembly 92, is connected.

Extending horizontally along the inner sides of the upstanding tray end walls 96,98 are elongated support members 102 having upper horizontal tracks 104, and narrower lower horizontal tracks 106, formed therein. The upper tracks 104 are configured to slidingly receive the notebook computer guide rails 28 when the computer is manually inserted into the interior of the tray structure, through the opening 60, this sliding receipt of the computer guide rails 28 being shown in FIG. 12. As the notebook computer 12 is inserted rearwardly into the tray structure, the cooperation between the guide rails 28 and the upper tracks 104 maintains the male pin connector portion 44 on the back side of the computer (see FIG. 3) in precise alignment with a female pin connector portion 44a projecting forwardly beyond the rear side wall 100 of the tray structure.

The lower support member tracks 106 slidingly receive opposite left and right end portions of a rectangular travel plate member 108 disposed within the tray structure for front-to-rear movement relative thereto and having a front-to-rear width less than that of the bottom tray wall 94. The travel plate 108 has a front side edge 110, and a rear side edge 112 having an upstanding rear side wall 114 along a right end portion thereof. Travel plate 108 is selectively drivable forwardly and rearwardly relative to the tray subassembly 92 by means of the previously mentioned motorized docking station drive system which includes an electric stepper motor 116 supported on the rear side wall 100 of the tray structure, by a mounting bracket 118, and having a forwardly projecting, externally threaded drive shaft 120.

Still referring to FIGS. 6–17, drive shaft 120 threadingly extends through a drive nut 122 fixedly secured to the rear end of a drive bracket 124 that extends forwardly through a notch 126 formed in the rear side wall 100 of the tray structure. The front end of the drive bracket 124 is fixedly secured to the upstanding rear wall 114 of the travel plate 108. Accordingly, motor-driven rotation of the shaft 122 in one direction drives the travel plate 108 forwardly within the interior of the tray structure, while motor-driven rotation of the shaft 122 in the opposite direction drives the travel plate 108 rearwardly within the interior of the tray structure.

The motorized docking station drive system also includes a specially designed latch assembly 130 (also depicted in FIGS. 18A–19B) which is carried on the underside of the travel plate 108, for driven movement therewith, and exposed through an opening 132 formed in the stationary bottom tray wall 94. As later described, the latch assembly 130 is operable to releasably secure the manually inserted notebook computer 12 to the travel plate 108 for motor-driven movement therewith within the interior of the tray structure portion of the docking tray subassembly 92.

General Operation of the Docking Station

Figure 20A:
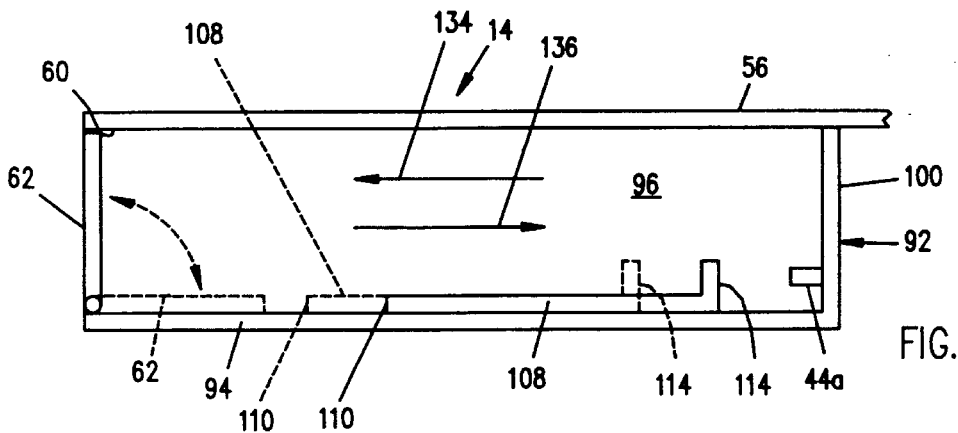
FIGS. 20A–20D are highly schematic cross-sectional views through the docking tray subassembly and sequentially illustrate the motor-driven movement of the travel plate and notebook computer therein.

FIGS. 20A–20D schematically depict the motor-driven movement of the travel plate 108 and the notebook computer 12 within the tray subassembly 92. Referring initially to FIG. 20A, before the notebook computer 12 is inserted into the interior of the docking station through its front opening 60, the travel plate 108 is normally in its intermediate receiving or "wait" position, shown in FIG. 20A, in which the front side edge 110 of the travel plate is spaced rearwardly apart from the front side edge of the bottom tray wall 94, and the upstanding rear wall 114 of the travel plate 108 is spaced forwardly apart from the rear side wall 100 of the tray structure. The schematically depicted travel plate position in FIG. 20A corresponds to the position of travel plate 108 shown in FIG. 9, with the corresponding orientations of the drive nut and bracket 122,124 being illustrated in FIGS. 9 and 10.

Figure 9:
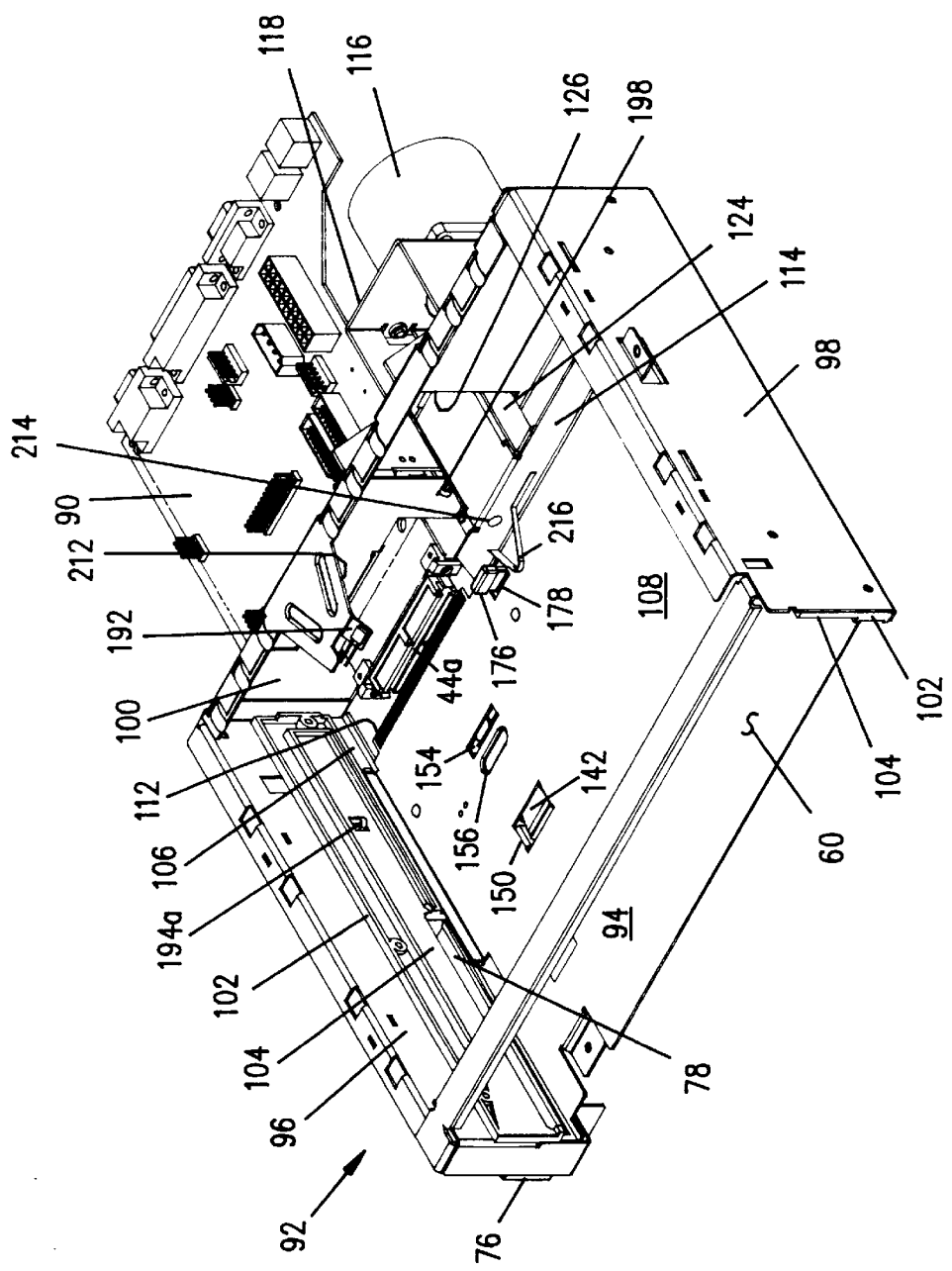
FIG. 9 is an enlarged scale front and right side perspective view of a docking tray subassembly portion of the docking station, with a motorized travel plate portion of the subassembly in its intermediate or "wait" position.

However, for various reasons, the travel plate 108 may at this time be disposed slightly forwardly or rearwardly of its wait position shown in FIGS. 9 and 20A. To assure that the travel plate 108 is precisely positioned in its wait orientation before the notebook computer 12 is manually inserted into the interior of the tray structure, the docking station drive system is activated in a manner subsequently described to cause the stepper motor 116 to forwardly drive the travel plate 108 from its solid line position in FIG. 20A to the indicated dotted line calibration position as indicated by the arrow 134. When the travel plate 108 forwardly reaches such calibration position, the stepper motor 116 is reversed and rotated through a predetermined number of steps to rearwardly drive the travel plate 108, as indicated by the arrow 136, precisely to its solid line wait position.

Figure 20B:
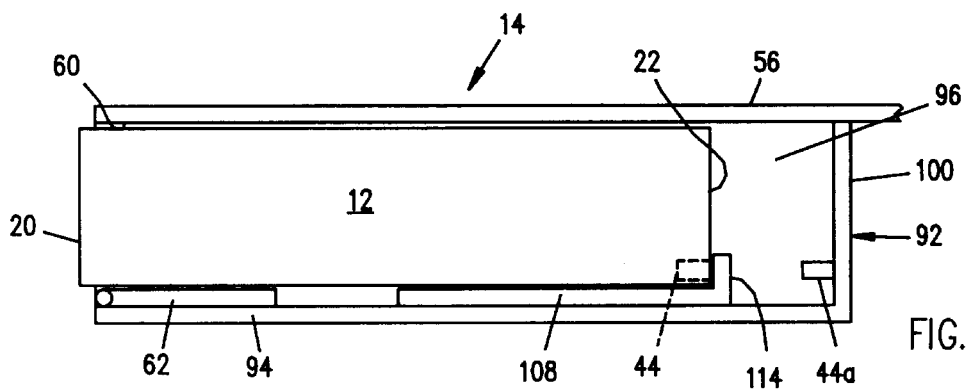

After this travel plate positional calibration is automatically effected, the notebook computer 12 is manually inserted into the interior of the tray structure, through opening 60, above the travel plate 108 until the rear side 22 of the inserted computer is brought into abutment with the upstanding rear wall 114 of the travel plate 108 as shown in FIG. 20B. At this point the latch assembly 130, in a manner later described, automatically acts to lock the inserted notebook computer 12 to the travel plate 108. The sliding receipt of the computer guide rails 28 in the support member tracks 104 (see FIG. 12) serves to precisely align the male pin connector portion 44 with the female pin connector portion 44a, as previously mentioned, in a forwardly spaced relationship therewith.

Figure 20C:
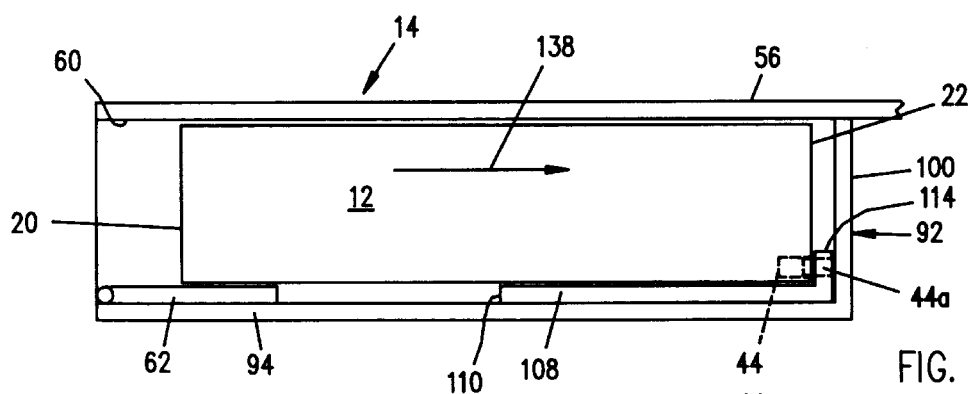

Next, the motorized docking station drive system rearwardly drives the travel plate 108, a nd thus the notebook computer 12 locked thereto, toward the rear tray structure side wall 100 (as indicated by the arrow 138 in FIG. 20C) to bring th e travel plate 108 to its docking position. This rearward driven movement of the travel plate-supported notebook computer 12 forcibly creates the operative interengagement of the computer and tray structure pin connector portions 44,44a as schematically depicted in FIG. 20C. Such interconnection operatively links the operating components in the notebook computer 12 and the docking station 14 and readies the resulting desktop computer station for operation using the external desktop peripheral devices 48,50 and 52 (see FIG. 1) under the processing control of the notebook computer motherboard.

It is important to note that no manual force is required to effect the interconnection between the mating pin connector structures 44 and 44a on the notebook computer and the docking station—such interconnection is forcibly and automatically achieved via the operation of the motorized docking station drive system. Additionally, as the notebook computer 12 is automatically driven from its FIG. 20B manually positioned receiving orientation to its FIG. 20C docked position, the sliding cooperation between the computer guide rails 28 and the support member tracks 104 maintains a very precise alignment between the pin connector portion 44a and the pin connector portion 44 rearwardly approaching it.

Figure 11:
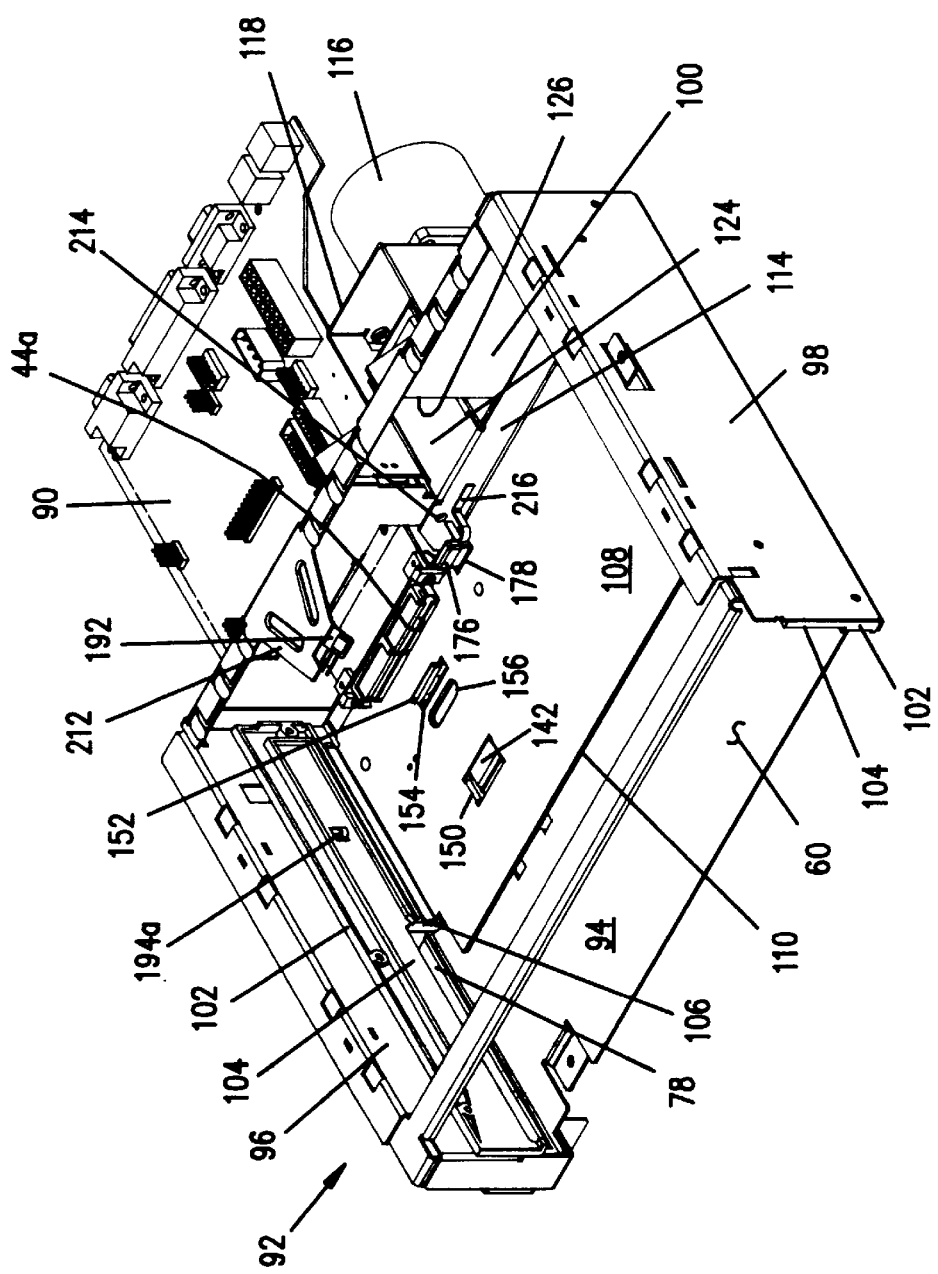
FIG. 11 is an enlarged scale front and right side perspective view of the docking tray subassembly with the travel plate in its rearwardly shifted docking position.
Figure 12:
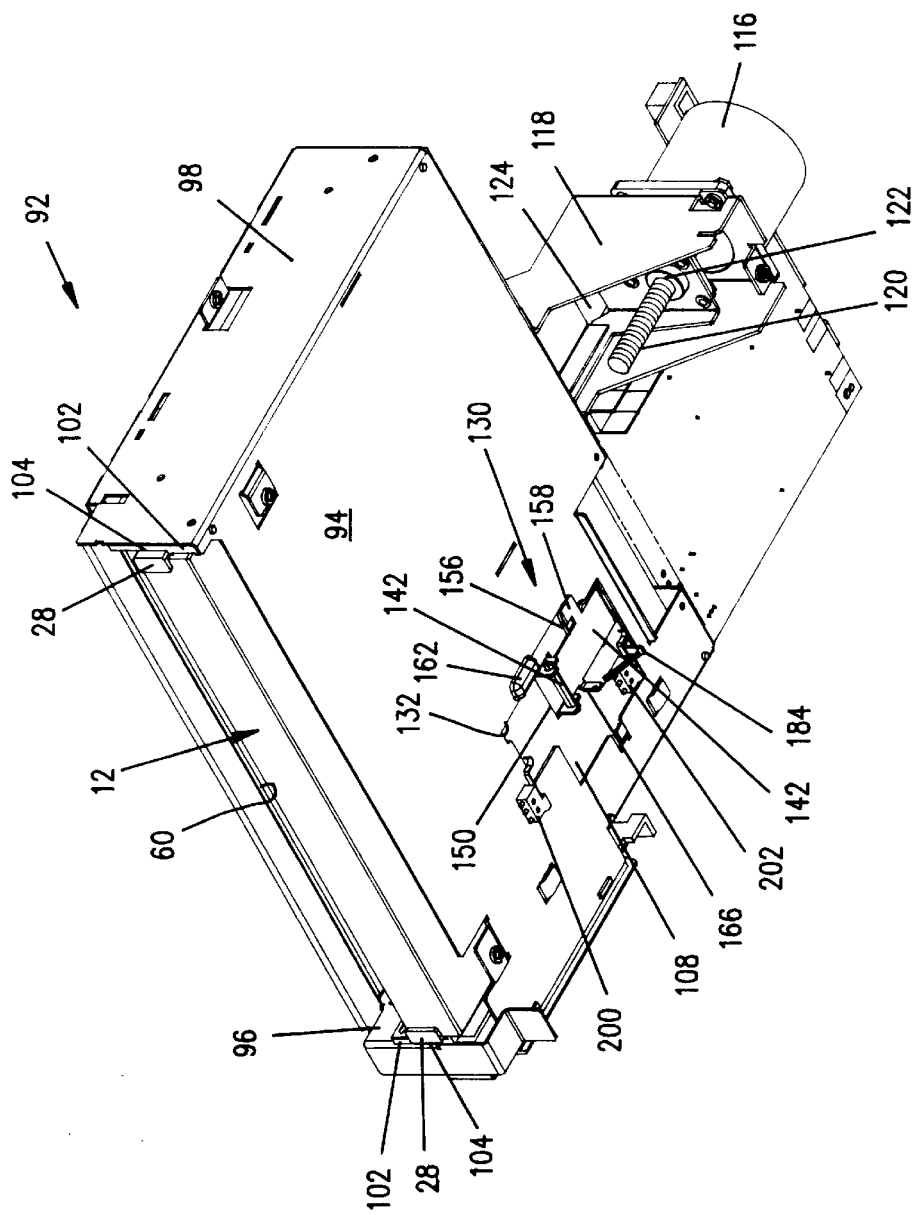
FIG. 12 is an enlarged scale bottom side perspective view of the docking tray subassembly with the travel plate in its docking position.
Figure 13:
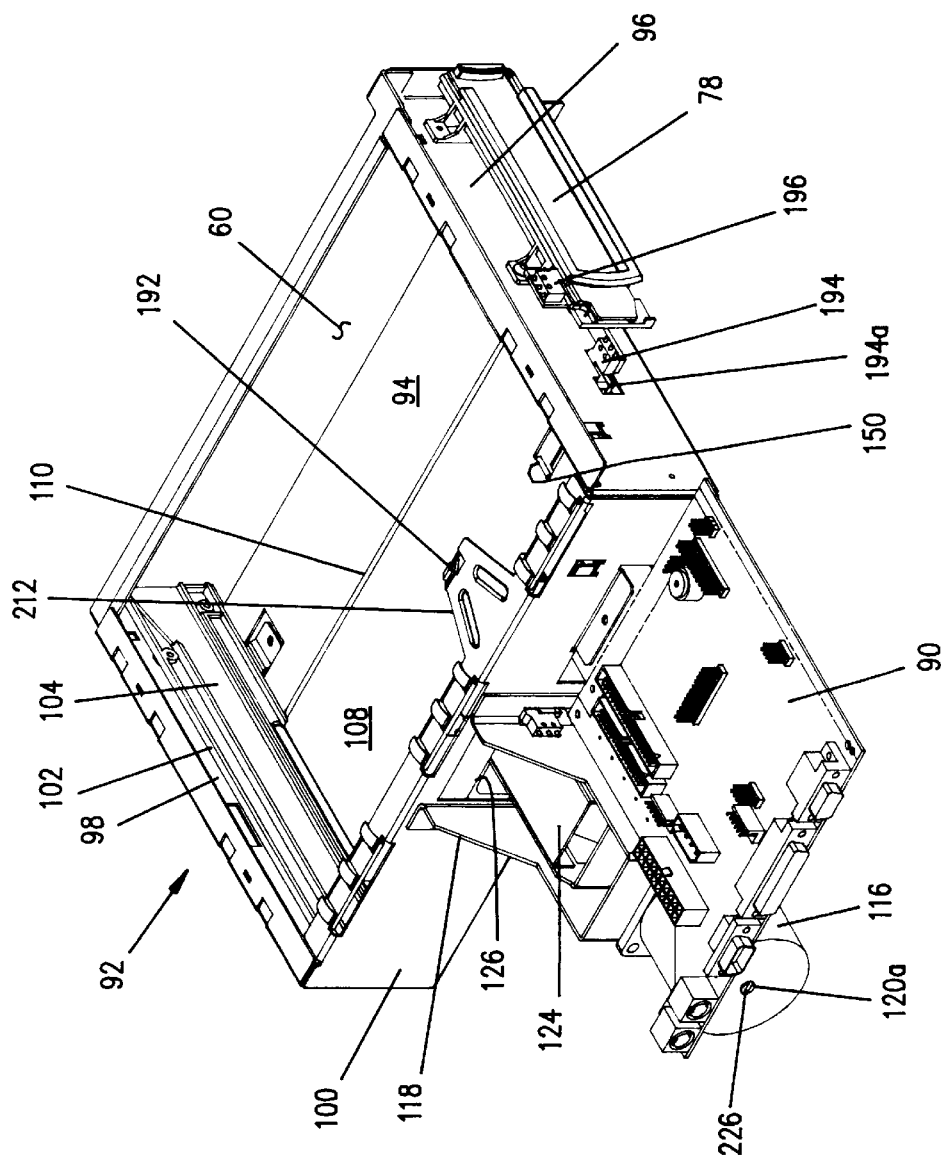
FIG. 13 is an enlarged scale rear and left side perspective view of the docking tray subassembly with the travel plate in its docking position.

Accordingly, the docking station automatically and mechanically provides the necessary connector alignment and interconnection force to achieve the operative docking of the notebook computer 12, thereby eliminating possible manual errors in these processes. The docked position of the travel plate 108 schematically depicted in FIG. 20C is also shown in FIGS. 11 and 13, with the corresponding orientations of the drive nut and bracket 122,124 being shown in FIGS. 11 and 12.

Figure 14:
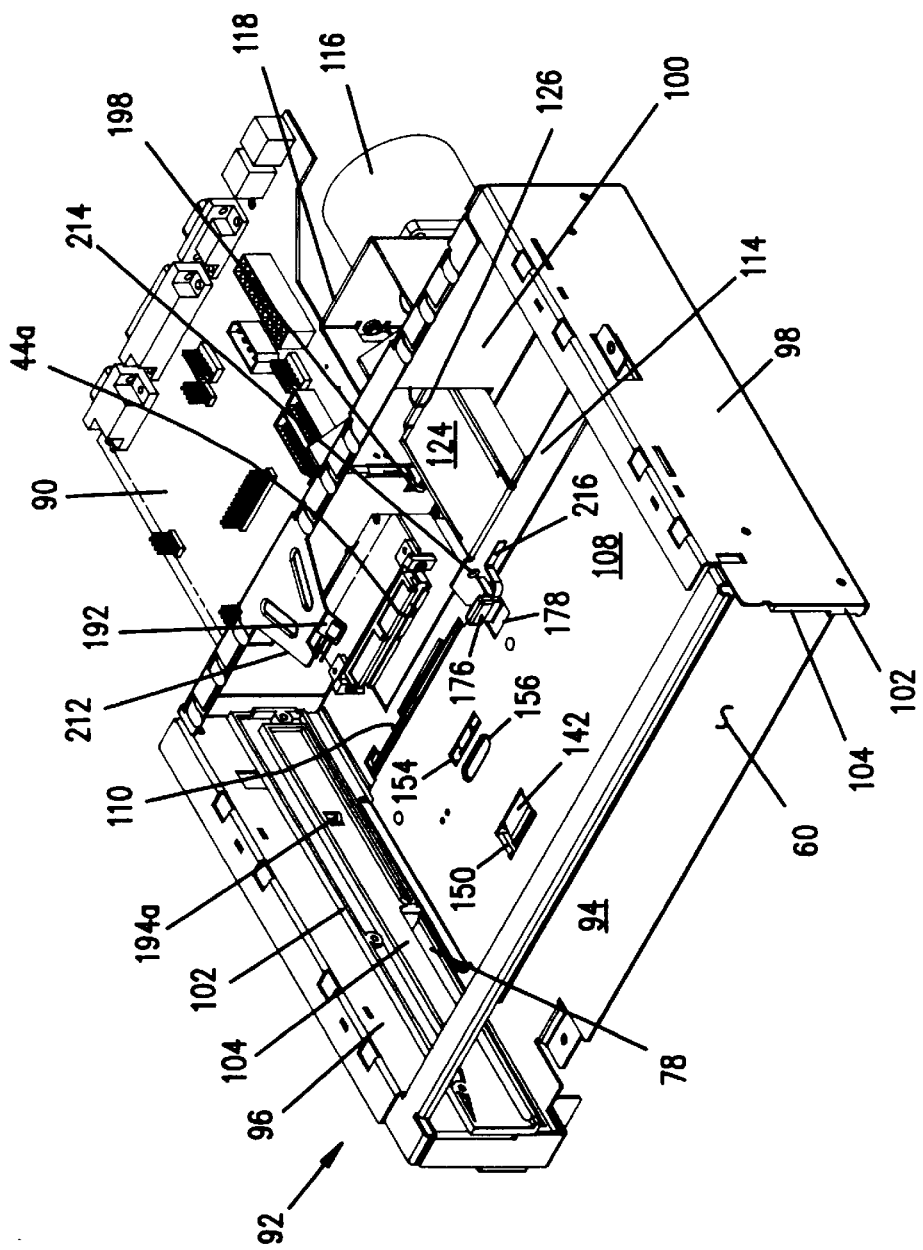
FIG. 14 is an enlarged scale front and right side perspective view of the docking tray subassembly with the travel plate in its forwardly shifted ejection position.
Figure 15:
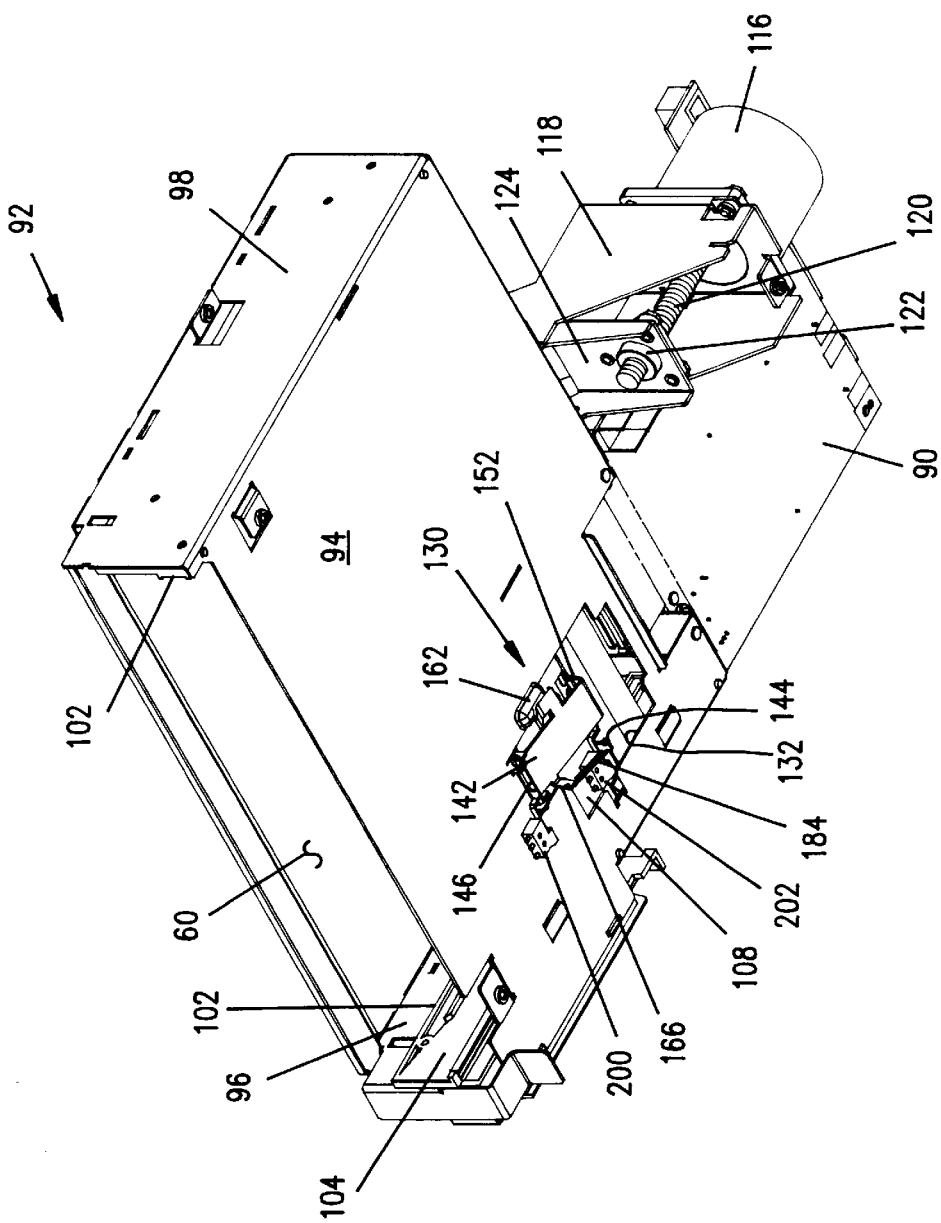
FIG. 15 is an enlarged scale bottom side perspective view of the docking tray subassembly with the travel plate in its ejection position.
Figure 16:
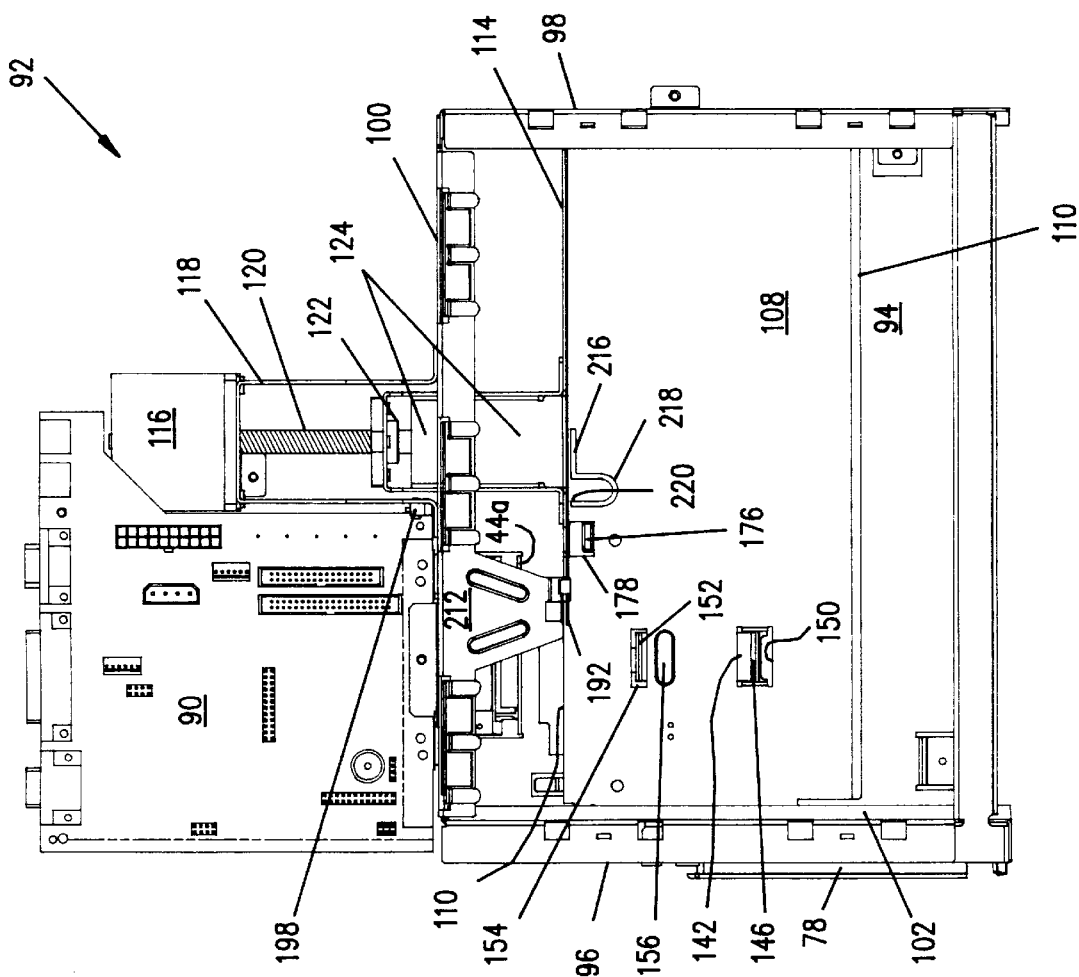
FIG. 16 is an enlarged scale top plan view of the docking tray subassembly with the travel plate in its ejection position.
Figure 17:
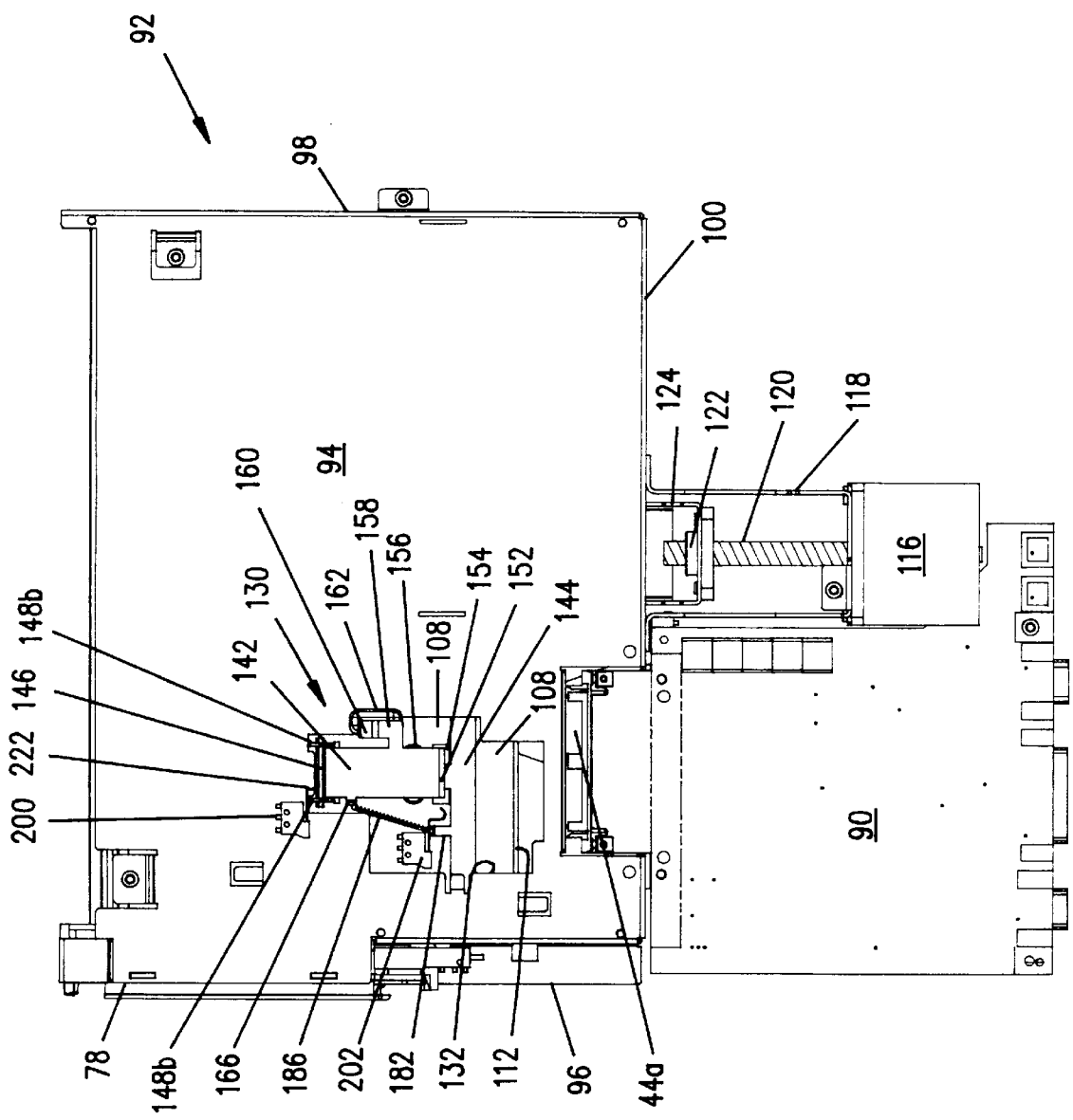
FIG. 17 is an enlarged scale bottom plan view of the docking tray subassembly with the travel plate in its ejection position.
Figure 20D:
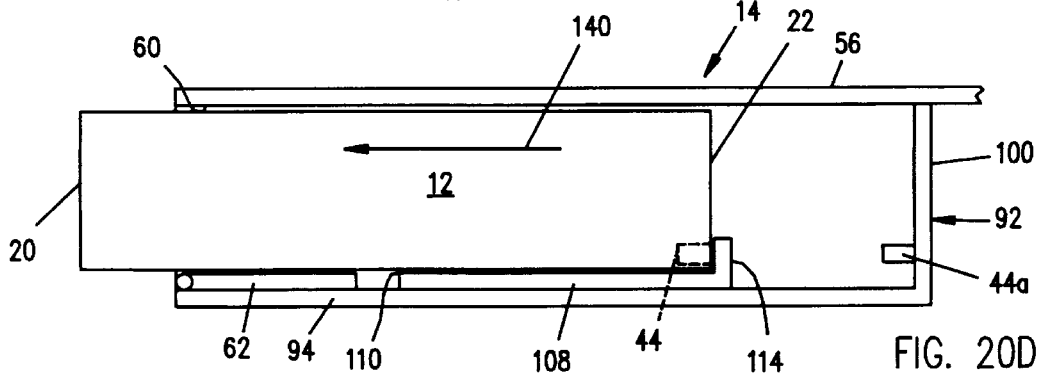

Referring now to FIG. 20D, to remove the docked notebook computer 12 from the interior of the docking station, the docking station switch 68 (see FIG. 1) is simply operated in its "eject" mode. This automatically operates the motorized drive system to forcibly translate the travel plate 108 (and thus the notebook computer 12) in a forward direction, as indicated by the arrow 140, to its full ejection position shown in FIG. 20D. The travel plate 108 in its full ejection position is also shown in FIGS. 14 and 16, with the corresponding orientations of the drive nut and bracket 122,124 being shown in FIGS. 14–17.

This forwardly driven movement of the travel plate 108 accomplishes two things. First, as schematically shown in FIG. 20D, it forcibly disconnects the pin connector portions 44,44a from one another, thereby terminating the previous operative interconnection between the notebook computer 12 and the docking station 14. Second, in a manner later described herein, it automatically causes the latch system 130 to unlock the notebook computer 12 from the travel plate 108.

Accordingly, when the travel plate 108 forwardly reaches its FIG. 20D full ejection position (which is the same as its dotted line calibration position shown in FIG. 20A), the notebook computer 12 may be manually pulled out of the tray structure interior, while the travel plate is automatically driven back to its FIG. 20A wait position, readying it for another calibration, docking and undocking driven movement cycle via the operation of the motorized docking station drive system. As shown in FIG. 20A, removal of the notebook computer 12 permits the spring-biased door plate 62 to pop up to its normal upright position in which it covers the opening 60.

Turning now to FIGS. 18A–19B, the latch assembly 130, as previously mentioned, is carried on the underside of the travel plate 108 for driven movement therewith, and is exposed through an opening 132 in the bottom tray structure wall 94. Latch assembly 130 includes an elongated rectangular flipper plate 142 and an elongated rectangular release plate 144.

Flipper plate 142 has a transverse pin portion 146 positioned at its inner end. The outer ends of pin portion 146 are journaled in two downwardly projecting tabs 148 positioned on opposite sides of a rectangular opening 150 formed through the travel plate 108. This connection permits the flipper plate 142 to pivot upwardly and downwardly relative to the travel plate 108, about the pin portion 146, as may be seen by comparing FIGS. 18A and 18B.

At the outer end of the flipper plate 142 is an upturned engagement tab 152 positioned directly beneath a rectangular opening 154 in the travel plate 108. A downwardly projecting embossment 156 formed on the travel plate limits the upward pivotal movement of the flipper plate 142. For purposes later described, when the flipper plate 142 is at its upwardly pivoted position (FIG. 18B), its outer end tab 152 extends upwardly through the travel plate opening 154 to above the top surface of the travel plate 108 as may be seen in FIGS. 6 and 7. On the other hand, when the flipper plate 142 is in its downwardly pivoted position (FIG. 18A), its outer end tab 152 is positioned in a downwardly spaced apart relationship with the travel plate opening 154 as shown in FIGS. 9 and 14.

Projecting from one side edge of the flipper plate 142 is a generally L-shaped tab 158 having an outer end portion 160 that forwardly extends, at a downwardly inclined angle, toward a downwardly projecting embossment 162 (see FIGS. 18A and 18B) formed on the bottom tray wall 94. Projecting from the opposite side edge of the flipper plate 142 is a tab 164 having a downturned outer end portion 166.

The elongated release plate 144 is pivotally connected at an inner end thereof, at point 168, to the underside of the travel plate 108. The outer end 170 of the release plate 144 is transversely enlarged and has an arcuate slot 172 therein. Captively retained in slot 172 is a rivet 174 secured to the travel plate 108 and serving to slidably retain the release plate end 170 against the travel plate as the release plate 144 pivots between its FIG. 19A and FIG. 19B positions. An upturned contact tab 176 formed on the rear side of the outer release plate end 170 extends upwardly through a rectangular opening 178 in the travel plate 108, with the upper end of the tab 176 being disposed above the upper side surface of the travel plate 108, adjacent its back wall segment 114, as shown in FIGS. 6,7,9,11 and 14.

Tabs 180 and 182 project outwardly from the front side of the release plate 144. With the release plate 144 in its FIG.

19A position the tab 180 extends across the underside of the travel plate opening 154, and with the release plate 144 pivoted to its FIG. 19B position the tab 180 is swung rearwardly away from the plate opening 154. The tab 182 has a downturned outer end 184 connected to the downturned flipper plate outer tab end 166 by a coiled tension spring 186. Spring 186 performs two functions. First, it pivotally biases the flipper plate 142 upwardly toward the underside of the travel plate 108. Second, it pivotally biases the release plate 144 forwardly toward the travel plate opening 154.

Figure 10:
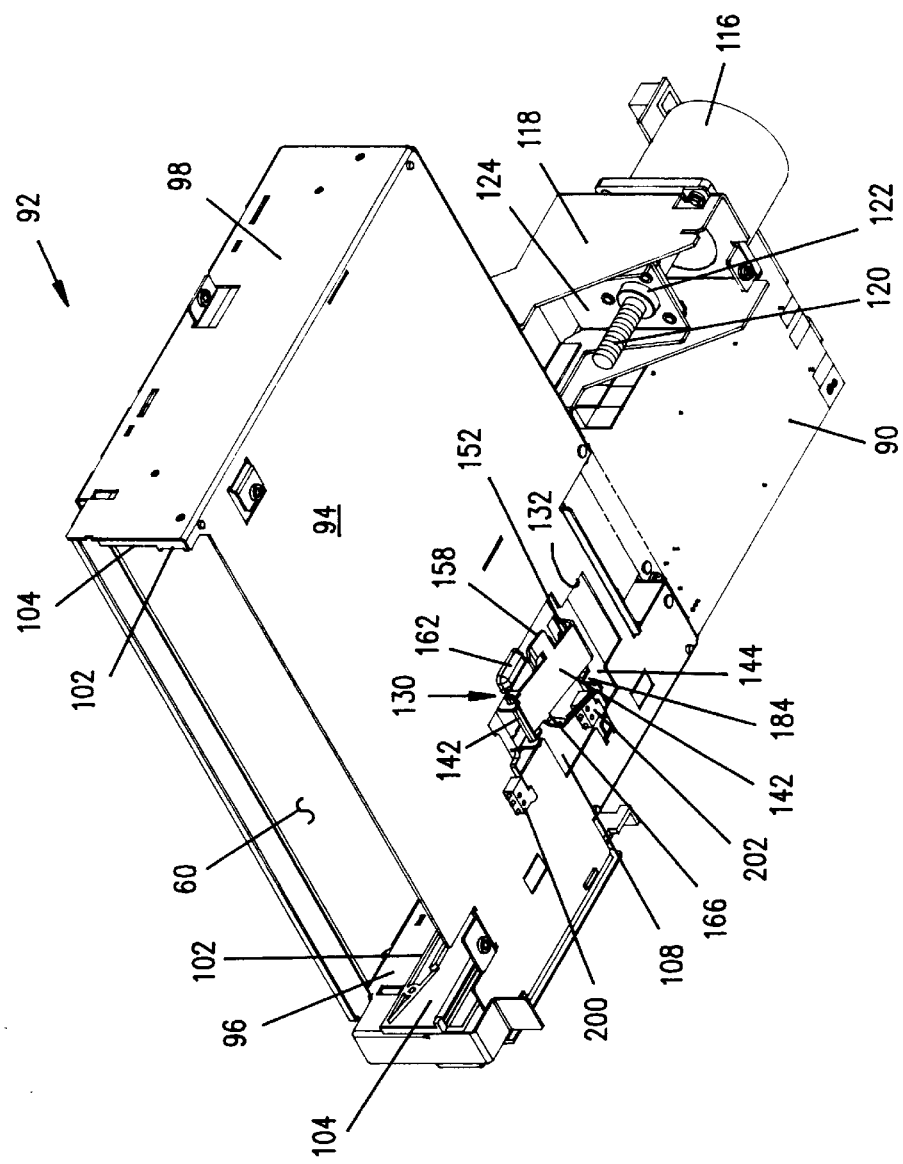
FIG. 10 is an enlarged scale bottom side perspective view of the docking tray subassembly, with the travel plate in its wait position, and illustrates a latch mechanism carried on the underside of the docking tray subassembly.

Still referring mainly to FIGS. 18A–19B, the latch assembly 130 functions as follows in conjunction with the motorized docking station drive system. The components of the latch assembly 130 are shown in FIGS. 18A and 19A in the relative positions that they assume when the travel plate 108 is in its wait position as illustrated in FIGS. 9 and 10. Specifically, the release plate 144 is pivoted to its forward limit position, the release plate contact tab 176 is projecting upwardly through the travel plate opening 178 adjacent its front side edge, the release plate tab 180 extends across the travel plate opening 154, and the flipper plate 142 is downwardly pivoted with the outer end of its engagement tab 152 being held against the underside of the release plate tab 180 by the pivotal biasing force of spring 186. The release plate tab 180 accordingly prevents the flipper plate tab 152 from extending upwardly through the travel plate opening 154.

When the notebook computer 12 is manually inserted into the docking station 14 as previously described, and the back side 22 of the inserted computer approaches the rear travel plate wall 114 (see FIG. 20B), the back computer side 22 engages and rearwardly moves the upwardly projecting release plate tab contact 176 and pushes it from its FIG. 19A position to its FIG. 19B position, thereby also rearwardly pivoting the release plate 144 from its FIG. 19A position to its FIG. 19B position. This pivotal motion of the release plate 144 moves the release plate tab 180 rearwardly away from the travel plate opening 154, thereby permitting the biasing force of spring 186 to upwardly pivot the flipper plate from its FIG. 18A position to its FIG. 18B position in which the flipper plate engagement tab 152 is extended upwardly through the travel plate opening 154 to above the top side surface of the travel plate 108.

This upward movement of the flipper plate engagement tab 152 through the travel plate opening 154 causes the tab 152 to enter the complementarily configured bottom side indentation 46 on the notebook computer 12 (see FIG. 4). This entry of the tab 152 into the indentation 46 locks the computer 12 to the travel plate for rearwardly driven movement therewith. Accordingly, when the travel plate 108 is motor-driven rearwardly to its docked position schematically depicted in FIG. 20C the aligned pin connector portions 44,44a are driven into mating engagement, thereby docking the notebook computer 12 and operatively connecting its internal operating components to those in the docking station 14.

Figure 18B:
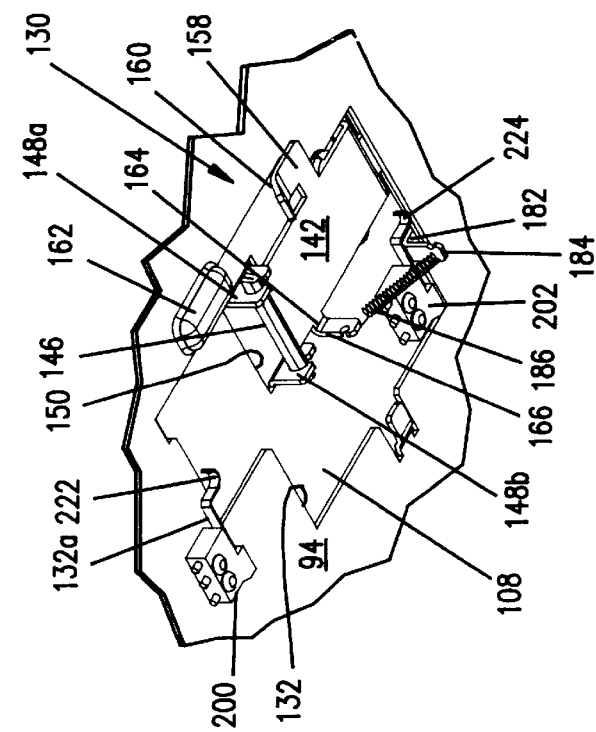
FIG. 18B is an enlarged scale bottom side perspective view of a portion of the docking tray subassembly illustrating the relative positions of the travel plate latch mechanism components when the travel plate is in its docking position.
Figure 18A:
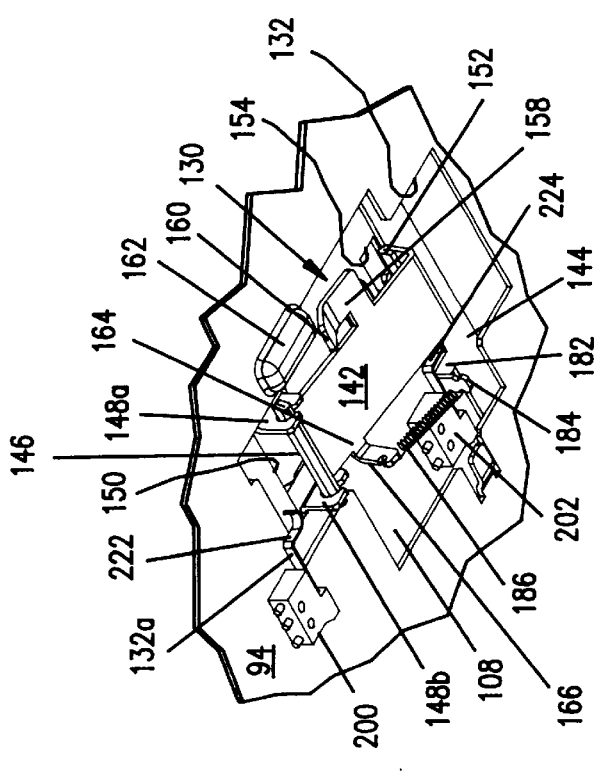
FIG. 18A is an enlarged scale bottom side perspective view of a portion of the docking tray subassembly illustrating the relative positions of the travel plate latch mechanism components when the travel plate is in its wait position.

In FIGS. 18B and 19B the components of the latch assembly 130 are shown in the positions that they are brought to when the travel plate 108 is rearwardly driven from its wait position to its docked position. As the travel plate 108 is later being driven forwardly from its docked position toward its ejection position, the downwardly and forwardly sloping flipper plate tab end portion 160 contacts and slides over the underside of the bottom tray wall embossment 162. This, in turn, causes the embossment 162 to downwardly pivot the flipper plate 142, thereby withdrawing the flipper plate engagement tab 152 from the bottom computer side indentation 46 and allowing the spring 186 to forwardly pivot the release plate 144 and once again position its tab 180 between the flipper plate engagement tab 152 and the travel plate opening 154.

The repositioning of the tab 180 in this manner keeps the engagement tab 152 from passing upwardly through the travel plate opening 154 until the travel plate 108 is driven back to its wait position and the computer is again manually inserted into the interior of the docking station as previously described.

The operation of the motorized docking station drive system is regulated by an electromechanical control system, subsequently described herein, that includes the following electrical switch structures:

1. A cover detect switch 190 shown in FIG. 21;
2. A notebook power-on detect switch 192 shown in FIG. 6;
3. A notebook detect switch 194 shown in FIG. 13;
4. A PCMCIA door detect switch 196 shown in FIG. 13;
5. An I/O door detect switch 198 shown in FIG. 16;
6. A zero position detect switch 200 shown in FIG. 18A;
7. A latch means or flipper plate detect switch 202 shown in FIG. 18A; and
8. A loopback detect switch 268 shown in FIG. 25.

Referring now to FIG. 21, the cover detect switch 190 is interiorly mounted on a rear chassis wall portion 204 of the docking station 14 and has an actuating arm 206. When the top housing cover portion 56 is operatively installed on the docking station 15, a rear side wall portion 56a of the housing cover 56 outwardly overlies the rear chassis wall 204, and a pin 208 secured to the cover wall 56a projects inwardly through an opening 210 in the chassis wall 204. The inwardly projecting pin 208 forwardly contacts the switch actuating arm 206 in a manner closing the switch 190. Via the subsequently described control system, closure of the switch 190 in this manner permits operation of the docking station drive station. Conversely, when the housing cover 56 is removed, the switch 190 opens to preclude operation of the docking station 14 without its housing cover portion 56 properly installed thereon.

The notebook power-on detect switch 192 is a photodarlington switch mounted on the outer end of a forwardly cantilevered support bracket 212 secured to the top edge of the rear tray structure wall 100. Switch 192 is positioned to directly overlie the computer "power on" indicating light 32a (see FIG. 1) on the top side of the notebook computer 12 as the computer is rearwardly carried by the travel plate 108 toward operative engagement with connector portion 44a. If the switch 192 senses that the indicating light 32a is on, it functions to prevent docking of the computer until it is turned off.

The notebook detect switch 194 is exteriorly secured to the left tray structure side wall 96 and has an actuating portion 194a extending, through a small opening in such side wall, into the adjacent upper support member track 104. Accordingly, when the notebook computer 12 is inserted into the interior of the docking station 14 as previously described, the left computer guide rail 28 contacts and depresses the switch actuating portion 194a to close the switch 194 which responsively signals the control system that the notebook computer 12 has been inserted into the docking station 14.

The PCMCIA door detect switch 196 is exteriorly secured to the left tray structure side wall 96 and positioned to be engaged by the door plate 78 and closed when the door plate 78 is closed. Conversely, when the door plate 78 is opened, the switch 196 is opened and operates to preclude the drive system from undocking the notebook computer 12. This function serves to protect PCMCIA cards still inserted into the docked computer, and projecting outwardly through the docking station opening 76 (FIG. 5), when the switch 68 (FIG. 1) is operated in its eject mode.

The I/O door switch 198 is mounted on the rear tray structure wall 100 directly behind a small opening 214 formed through the rear travel plate wall 114. Switch 198 operates in conjunction with an elongated flexible metal plate member 216 having one end fixedly secured to the front side of the travel plate wall 114, and a forwardly curved outer end portion 218 having a rearwardly directed free end 220 (see FIG. 16) forwardly adjacent the travel plate rear wall opening 214.

As the inserted notebook computer 12 is rearwardly driven toward its docked position, with the rear side computer door 38 (see FIGS. 3 and 4) properly opened, the bent metal plate portion 218 passes inwardly through the opened door 38, contacts the computer's metal I/O plate 42 and electrostatically discharges it prior to the docking of the computer. However, if the computer door 38 is closed, the bent plate portion 218 is engaged by the closed door 38 and rearwardly deflected by continued rearward movement of the travel plate 108. Such rearward deflection of the bent plate portion 218 forces the free plate end 220 rearwardly through the travel plate wall opening 214 and causes it to engage the switch 198. The engaged switch 198 responsively terminates the docking motion of the travel plate 108 to thereby prevent the mating engagement of the pin connector portions 44,44a. In contrast, any rearward deflection of the bent plate portion 218 resulting from contact with the I/O plate 42 will fail to cause the engagement of the switch 198 as there is insufficient rearward movement of the travel plate 108 before operative engagement of the connector portions 44,44a to deflect the bent plate portion 218 sufficiently to cause engagement of the switch 198.

The zero position detect switch 200 is secured to the underside of the bottom tray wall 94, forwardly of the latch assembly 130, and has an actuating arm portion 222. When the travel plate 108 is forwardly driven from its wait position to its calibration position, or from its docked position to its ejection position as the case may be, the tab 148b engages and forwardly depresses the switch actuating arm 222. In response to the depression of its actuating arm 222, the switch 200 causes the drive system to rearwardly move the travel plate 108 from its forward limit (or "zero") position (i.e., either its calibration or ejection position) back to its wait position.

The flipper plate detect switch 202 is a normally open switch, is secured to the underside of the travel plate 108 for movement therewith, has an actuating arm portion 224, and operates to indicate to the drive system the pivotal position of the flipper plate 142. When the release plate 144 is in its FIG. 19A orientation (in which the flipper plate 142 is "down"), the downturned outer end 184 of the release plate tab 182 contacts and depresses the actuating arm 224 as shown in FIG. 18B, thereby closing the switch 202. Conversely, when the release plate 144 is in its FIG. 19B orientation (in which the flipper plate 142 is "up"), the downturned outer end 184 of the release plate tab 182 is disengaged from the actuating arm 224, thereby permitting the switch 202 to return to its normally open mode.

The so-called loopback detect "switch" 268 is, in fact, an electrical circuit open between a pair of electrical contacts 270a, 272a (see FIG. 25) of the connector portion 44a of the docking station 14. When the connector portions 44, 44a are operatively interengaged, electrical contacts 270a, 272a engage corresponding electrical contacts 270, 272 of the connector portion 44 of the notebook computer 12. As contacts 270 and 272 are jumpered together, this closes the loopback detect circuit, thereby providing a detectable indication that the rearward movement of the travel plate 108 has effected the operative interengagment of the connector portions 44, 44a to complete the docking procedure.

Drive Motor Access and Chassis Locking System

As illustrated in FIG. 13, a rear end portion 120a of the stepper motor drive shaft 120 is exposed at the back end of the motor 116 and has formed therein a screwdriver slot 226. In the event that the drive system becomes jammed or otherwise inoperative for some reason, a screwdriver may be used in conjunction with slot 226 to manually rotate the stepper motor to permit the inserted notebook computer 12 to be unlocked from the travel plate 108 and withdrawn from the interior of the docking station 14 by manually driving the travel plate 108 forwardly until the flipper plate is downwardly pivoted to withdraw the engagement tab 152 from the bottom computer side indentation 46. Manual driving of the travel plate 108 is mechanically stopped, by the engagement of the tab 148b with the bottom tray wall front opening surface portion 132a (see FIGS. 18A and 18B), at a position just forward of the travel plate zero position. Screwdriver access to the slot is provided by the previously mentioned motor access opening 82 on the back side of the computer 12 (see FIG. 5) and an aligned opening 82a formed in the rear chassis wall 204.

A chassis locking system is incorporated in the docking station 14 and serves, for anti-tampering purposes, to releasably lock the housing cover 56 to the interior chassis portion of the docking station, and also selectively preclude access to the motor shaft slot 226 via the wall openings 82 and 82a.

Referring now to FIGS. 5, 8, 22 and 23, the chassis locking system includes a locking plate member 228 positioned inwardly of the chassis wall 204 immediately behind a complementarily configured opening 230 (see FIG. 8) formed through the chassis wall 204 beneath the access opening 82a. Plate 228 is secured to the keylock 70 for key-driven rotation relative to the docking station between a horizontal position in which plate 228 is aligned with the opening 230 and may be outwardly withdrawn therethrough, and a vertical position in which the plate extends upwardly behind the chassis wall and thus precludes removal of the housing cover portion 56 from the balance of the docking station 14. With the plate 228 in its vertical position, the plate inwardly blocks the access openings 82 and 82a, thereby preventing insertion of a screwdriver therethrough.

Electromechanical Control System

As previously mentioned, the operation of the motorized docking station drive system is regulated by a specially designed electromechanical control system, including the switches 190–202 and 268 generally described above, which will now be described in detail with reference to FIGS. 24–28.

Referring next to FIG. 24, a simplified block diagram of the system planar board 90 which controls the operation of the mechanized docking system and the energization of the notebook computer 12 and selected operating components of the docking station 14 and which provides the operative interface between components of the notebook computer 12 and the docking station 14, the external peripheral devices 48, 50 and 52 and the docking station drives 72, 74 and 88 will now be described in greater detail. Installed on the system planar board 90 is a microcontroller 232, for example, a Model 80C51SL microcontroller manufactured by Intel Corporation of Santa Clara, Calif., which in conjunction with electrically programmable read only memory (or "EPROM") 234 and static random access memory (or "SRAM") 236, controls the mechanized docking of the notebook computer 12 within the docking station 14 and the selective energization and de-energization of the notebook computer 12 and selective operating components of the docking station 14.

More specifically, during both the docking and ejection procedures, the microcontroller 232 receives data regarding conditions within the docking station 14 which may affect these procedures from selected ones of the cover detect switch 190, the notebook power-on switch 192, the notebook detect switch 194, the PCMCIA door detect switch 196, the I/O door switch 198, the zero position detect switch 200, the flipper plate detect switch 202 and the loopback detect switch 268 via a 2X8 jumper connector 238, executes a series of instructions embedded as firmware within the microcontroller 232 to determine, in accordance with the docking and ejection procedures described in greater detail below, the appropriate steps to be taken during such procedures in view of the received data, and issues commands to a motor controller 240 which is connected, via connector 242, to the stepper motor 116. In response to signals received from the microcontroller 232, the motor controller 240 instructs the stepper motor 116 to rotate the drive shaft 120 a specified number of steps in a selected direction, each step resulting in either the forward or rearward movement of the travel plate 108 a horizontal distance which corresponds to the step. The microcontroller 232 also issues commands, via 2X12 connector 243, to the display window 66 to generate messages related to the commands issued to the stepper motor 116.

In addition to controlling the mechanized docking of the notebook computer 12 with the docking station 14, the system planar board 60 further provides a connective interface between the notebook computer 12, various operating components of the docking station 14 and various external peripheral devices associated with the docking station 14. Specifically, when the connector portion 44 of the notebook computer 12 engages the connector portion 44a of the docking station 14, the notebook computer 12 is connected, via address, data and control bus 244 to the hard disc drive 88 through IDE interface connector 246 and, via the IDE interface connector 246, to the monitor 48, keyboard 50, mouse 52, 3.5" floppy drive 72 and 5.25" floppy drive 74 through connectors 248, 250, 252, 254 and 256, respectively. The notebook computer 12 is further connected to serial and parallel port connectors 258, 260 via the address, data and control bus 244 and buffer 262 and to expansion bay structure 80 via the address, data and control bus 244 and I/O expansion connector 264.

Finally, the microcontroller 232 also controls the energization of the notebook computer 12 and selected operating components of the docking station 12. To do so, the power supply unit 86, which is connected to the system planar board 90 by power supply connector 266, continuously supplies power to the microcontroller 232 and the display window 66 via a standby VCC line while the remaining power lines are bussed through power supply controller 268. As the microcontroller 232 is provided with a continous supply of power, the microcontroller 232 may issue commands to selectively energize and de-energize the notebook computer 12 and selected operating components of the docking station 14 and messages relating to its operation, even when the remaining operating components of the docking station 14 remain de-energized. To energize and de-energize the notebook computer 12 and selected components of the docking station 14, the microcontroller 232 issues commands to power supply controller 268 to selectively activate the +/−5,12 volt power lines to energize various operating components of the docking station 14 and the 18 volt power line to energize the notebook computer 12.

Figure 25:
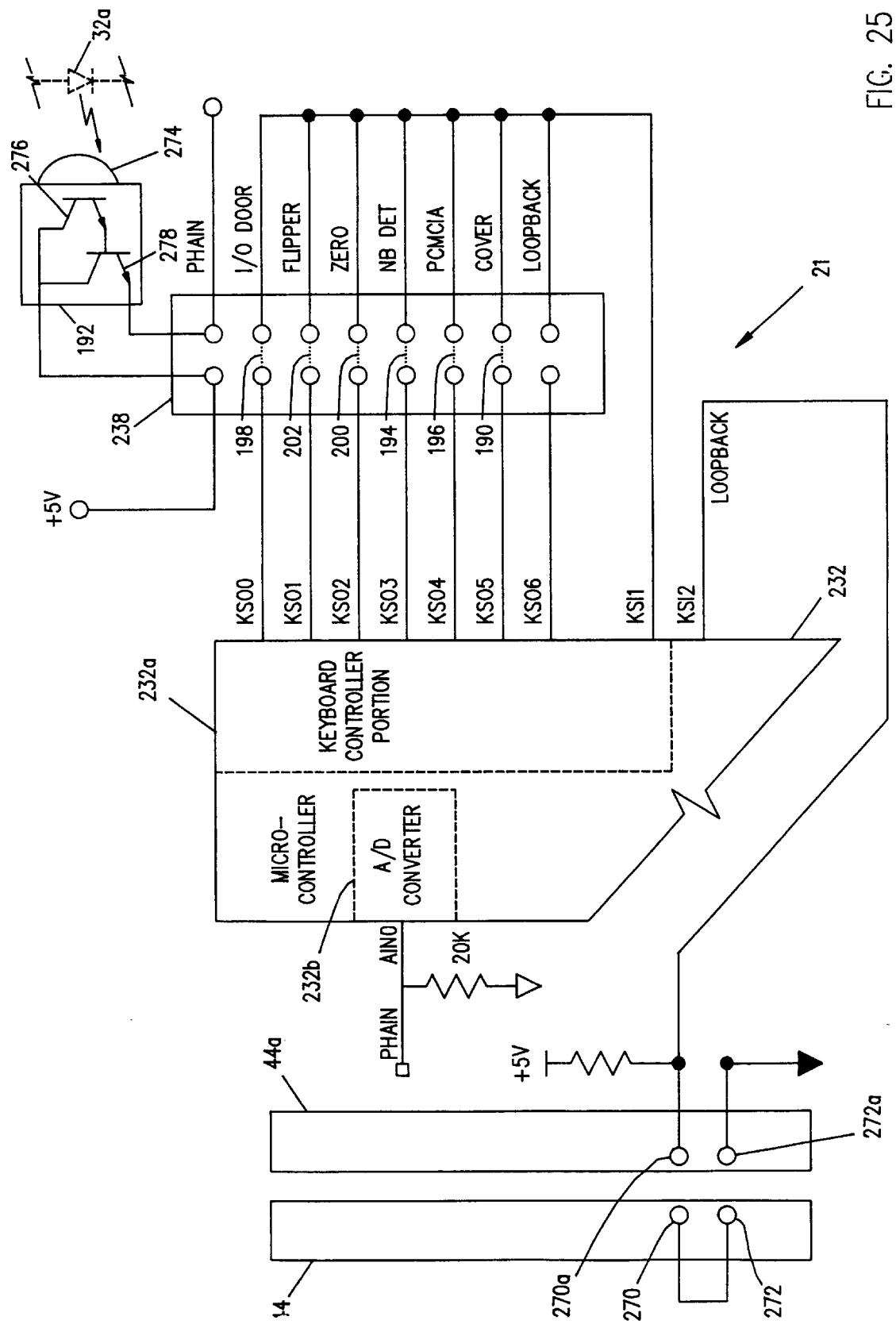
FIG. 25 is a schematic illustration of the electromechanical control system for regulating the operation of the motorized travel plate portion of the docking tray subassembly illustrated in FIGS. 9–19B.

Referring next to FIGS. 24 and 25, the electromechanical control system for regulating the operation of the motorized travel plate 108 will now be described in greater detail. The microcontroller 232 includes a keyboard controller portion 232a which, in traditional applications of the microcontroller 232 would control the operation of a keyboard to detect the input of data, therefrom by sensing the depression of keys, is utilized in the present application to collect data regarding the conditions within the docking station 14 which may affect how the microcontroller 232 controls movement of travel plate 108 during docking, ejection and reset procedures described below by scanning the switches 190, 194, 196, 198, 200, 202 and 268.

More specifically, the switches 190, 192, 194, 196, 198, 202, 202 and 268 are connected between respective contact pairs provided on the 2X12 jumper connector 238. The keyboard controller portion 232a sends periodic inquiry signals to the switches 190, 194, 196, 198, 200, 202 and 268 via keyboard controller outputs KS00, KS01, KS02, KS03, KS04, KS05 and KS06, respectively, and depending on the return level received at keyboard controller inputs KSI1 and KSI2, determines whether the switches 190, 194, 196, 198, 200, 202 and 268 are open or closed. As there is a common keyboard controller input KSI1 for the keyboard controller outputs KSO0, KSO1, KSO2, KSO3, KSO4, KSO5, and KSO6, the keyboard controller 232a sends the periodic inquiry signals to the switches 190, 194, 196, 198, 200, 202 and 268 in a sequence more fully described below.

The notebook power-on switch 192 is a OP560 series NPN silicon photodarlington physically mounted on the support bracket 212 and electrically connected to a contact pair of the 2X12 jumper connector 238 such that the photodarlington input is connected to the +5 voltage line and the photodarlington output connected to the PHAIN line. Whenever light is shined on lens 274 of the photodarlington, sufficient electric current is generated so that transistors 276, 278 conduct, thereby generating current along line PHAIN. Line PHAIN is connected to the microcontroller at pin AIN0 so that the voltage across line PHAIN, which may vary between 0 and +5 volts depending on the amount on light shined on lens 24, may be input to A/D converter 232b for conversion to a digital value and, depending on the level of the detected voltage signal and its oscillation frequency, the microprocessor 232 may determine that the detected voltage signal as indicative of a power-on condition for the notebook computer 12.

More specifically, after the notebook computer 12 is engaged by the flipper plate 142, the travel plate 108 begins to rearwardly drive the notebook computer 12 towards operative engagement with the connector portion 44a. However, if the notebook computer 12 is energized when operative engagement occurs, various components of the docking station 14, in particular, the system planar board 90 could be damaged and/or destroyed by such an energized operative engagement. The notebook computer 12 is equipped, however, with an green LED 32a which is "illuminated" whenever the notebook computer 12 is energized.

The LED 32*a* is illuminated whenever it oscillates between on and off conditions at a frequency of 64 Hz. such that it appears to the eye to be in the on condition at all times. Prior to initiation of the docking procedure, the photodarlington 192 conducts current at a first (or "zero") level based upon the level of ambient light in the interior of the docking station 14. If the notebook computer 12 is energized when it approaches operative engagement with the connector portion 44*a*, the notebook power-on switch 192, will begin to conduct at an increased current level when the LED 32*a* becomes aligned with the photodarlington. Accordingly, the voltage detected by the microprocessor 232 will noticeably increase and will oscillate between its zero level and its increased level at a frequency of 64 Hz. When the microprocessor 232 detects the presence of an increased voltage oscillating at 64 Hz., it concludes that the increased voltage is due to the illumination of the LED 32*a* and will issue instructions to the motor controller 240 to terminate rearward stepping of the travel plate 108 and initiate a reset procedure and issue instructions to the display window 66 to generate a message indicating that the notebook computer 12 is energized. However, before it can conclusively determine that the notebook computer 12 is energized, the microprocessor 232 must detect the aforementioned oscillating voltage for a period greater than 0.5 seconds due to the fact that, if the notebook computer is in "standby" mode, an operating mode which, as set forth below, is acceptable for docking purposes, the LED 32*a* will be similarly illuminated for a period of 0.5 seconds every 8.0 seconds.

Figure 26A:
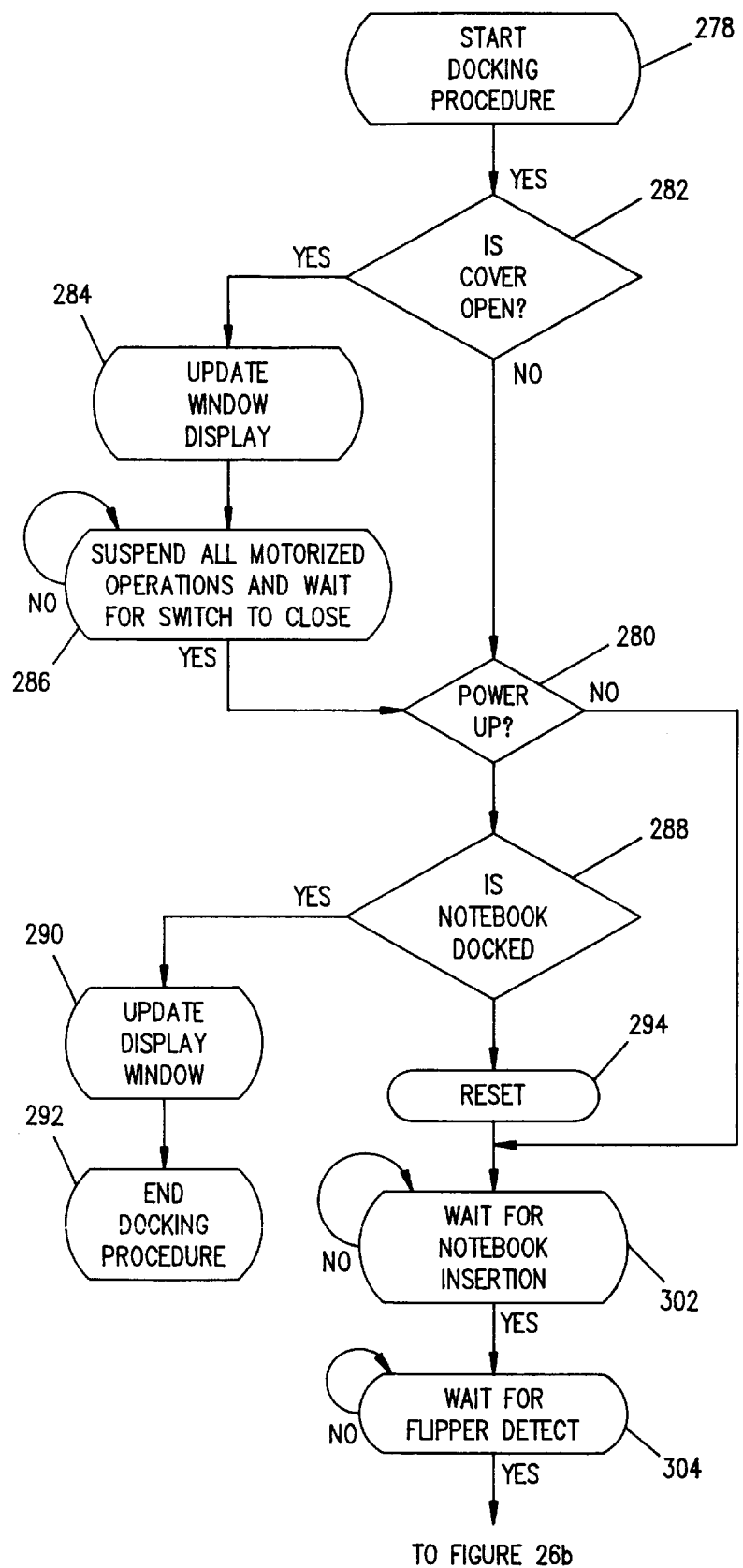
FIG. 26 is a flow chart illustrating a procedure for docking the notebook computer illustrated in FIGS. 2–4 into operative engagement with the docking station illustrated in FIGS. 1, 5–19B and 21–23.
Figure 26B:
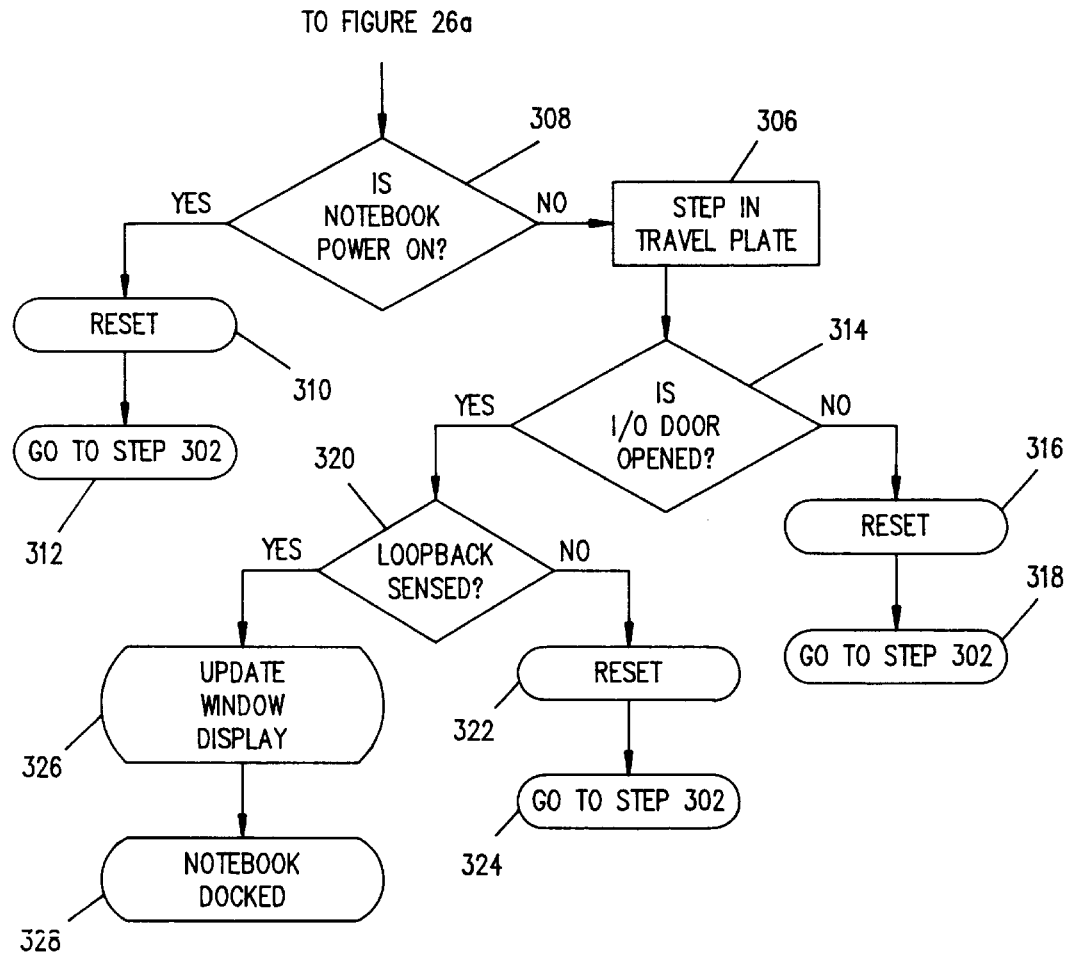
Figure 27:
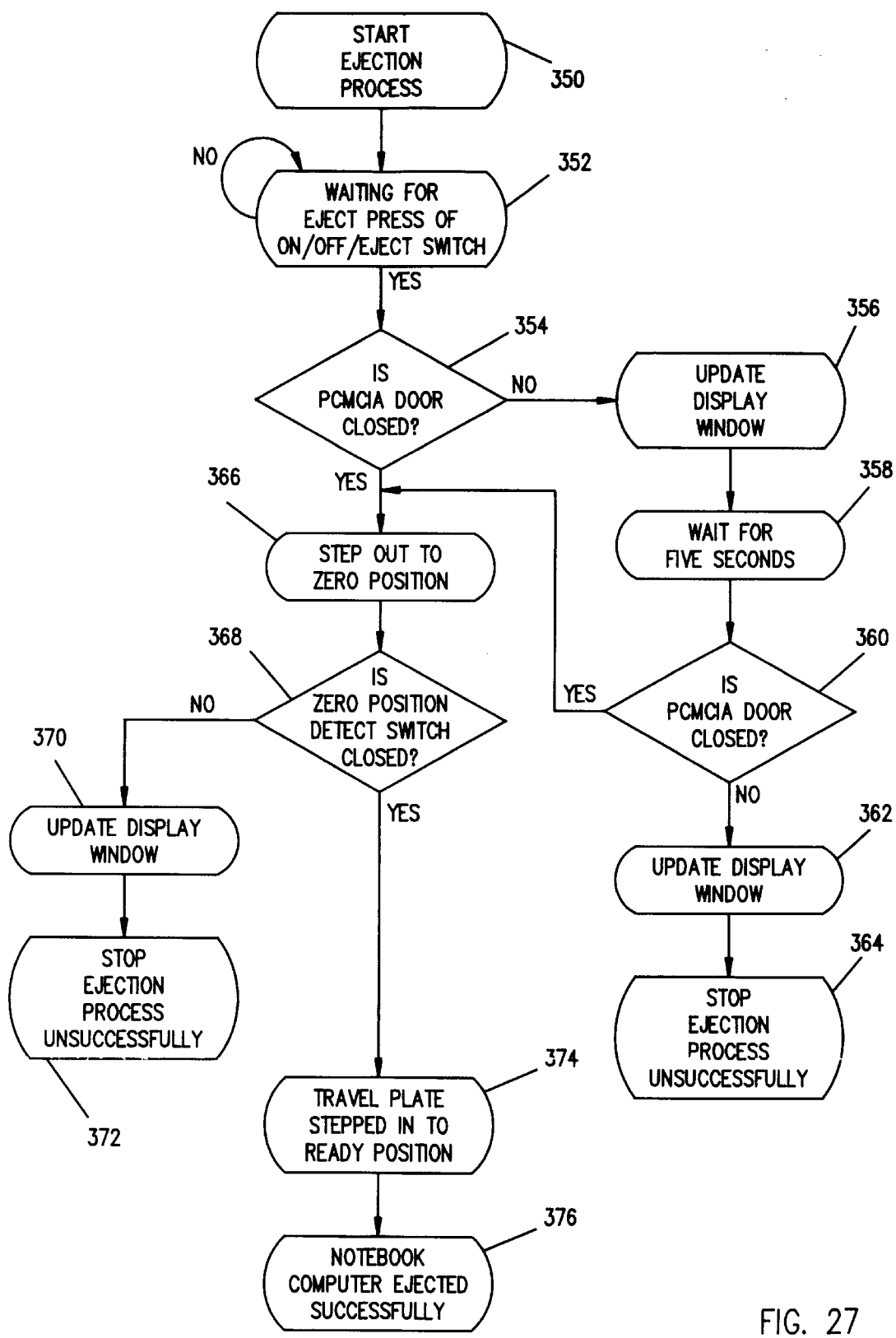
FIG. 27 is a flow chart illustrating a procedure for ejecting the notebook computer illustrated in FIGS. 2–4 when operatively engaged to the docking station illustrated in FIGS. 1, 5–19B and 21–23.
Figure 28:
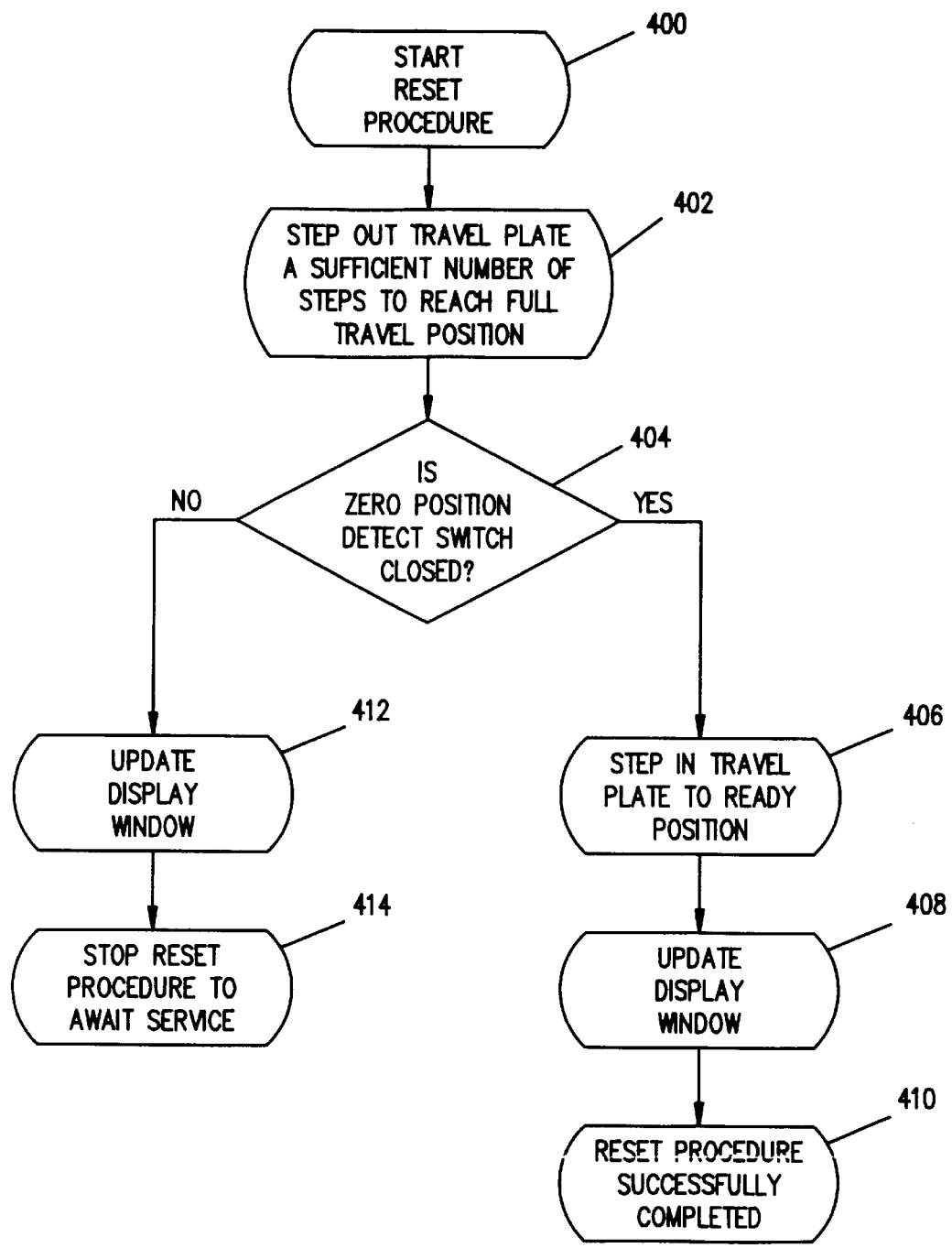
FIG. 28 is a flow chart illustrating a procedure for resetting the travel plate portion of the docking tray subassembly illustrated in FIGS. 9–19B.

Referring next to FIGS. 26–28, docking, ejection and reset procedures controlled by the microcontroller 232 will now be described in greater detail. Referring first to FIG. 26, the procedure by which the notebook computer is docked with the docking station 14 may now be seen. For purposes of describing the docking procedure, it will be presumed that, prior to initiation of the docking procedure, the docking station 14 is connected to an AC power source but is powered-down, i.e. all operating components are de-energized with the exception of the microcontroller 232 which is being supplied by the standby VCC line. The docking procedure commences at step 278 and, continues on to step 282 where it is determined whether the top cover portion 56 of the housing 54 has been removed, most commonly, either for maintenance or repair of the docking station 14. As previously described, whenever the top cover portion 56 is removed, the cover detect switch 190 opens. Accordingly, if the microcontroller 232 issues an inquiry signal to contact KSO5 and receives at contact KSI1 an indication that switch 190 is closed, the microcontroller 232 determines that the top cover portion 56 has been closed properly and the docking procedure continues at step 280. If, however, the microcontroller 232 receives an indication that switch 190 is open, the microcontroller 232 determines that the top cover portion 56 has either been removed or improperly installed and will transmit a command to the display window 68 at step 284 instructing the display window 68 to generate a message indicating that the top cover portion 56 of the housing 54 has been removed. The microcontroller 232 will then suspend all motorized activities involving the stepper motor 116 at step 286 and await an indication that the cover detect switch 190 has been closed before continuing on to step 280. It should be further noted that, as the cover detect switch 190 is a safety switch provided to prevent accidental pinching by the travel plate 108 during forward or backward movement thereof, whenever the microcontroller 232 detects that the cover detect switch 190 is open, the microcontroller 232 will initiate a similar suspension of all motorized activities until closure of the cover detect switch 190 is detected. Furthermore, as this inquiry is an exception to the sequential detection of switch openings and/or closures required to perform the motorized docking, ejection and resetting procedures described herein, it is contemplated that the microprocessor 232 intermittently issue the "cover open?" inquiry between the sequential inquiries described below.

Continuing with the docking procedure, at step 280, it is determined whether this docking procedure is commencing at power up. If not, the procedure jumps to step 302. If so, the microcontroller 232 at step 288, then determines whether the notebook computer 12 is already docked with the docking station 14. The microcontroller 232 makes this determination by issuing sequential inquires regarding the condition of four switches: the notebook detect switch 194, the zero position detect switch 200, the flipper plate detect switch 202 and the loopback detect switch 268, at contacts KS03, KSO2, KSO1 and KSO6, respectively, and receiving respective indications at contact KSI1 whether the switches have been closed. For these switches, the notebook detect switch 194 is closed when the notebook computer 12 has been inserted into the opening 60 of the docking station 14, the zero position detect switch 200 is closed when the travel plate 108 is in the full travel position, the flipper plate detect switch is closed when the engagement tab 152 of the flipper plate 142 projects through the travel plate opening 154 and the loopback detect switch 268 is closed when the connector portions 44, 44*a* are operatively interengaged with each other. If it is determined, by receiving, at contact KSI1, indications that the zero position detect switch 200 is open while the notebook detect switch 194, the flipper plate detect switch 202 are closed and the loopback detect switch indicates an operative interengagement of the connector portions 44, 44*a*, the microcontroller 232 determines that the notebook computer 12 is docked with the docking station 14. In this circumstance, the procedure will continue to step 290 where the microprocessor 232 will issue a command to update the display window 66 with a message indicating that the notebook computer 12 is docked with the docking station 14 and the docking procedure will end at step 292.

Returning to step 288, if it is determined that the notebook computer 12 is not docked, i.e. the sequential inquiries of the notebook detect switch 194, the zero position detect switch 200, the flipper plate detect switch 202 and the loopback detect switch 268 at contacts KSO3, KSO2, KSO1 and KSO6 produce any resultant indications at contact KSI1 other than the particular combination described above, the procedure continues to step 294 where the travel plate 108 is reset.

Referring momentarily to FIG. 28, the reset procedure, by which the docking station 14 clears any prior positioning of the travel plate 108 and returns to the ready position, will now be described in greater detail. The reset procedure is initiated at step 400 and, at step 402, the microcontroller 232 instructs the motor controller 240 to step the stepper motor 116 a selected number of steps sufficient to forwardly drive the travel plate 108 from its position at the initiation of the reset procedure to the full travel position. More specifically, the microcontroller 232 will instruct the motor controller 240 to forwardly drive the stepper motor 116 "x+y" steps, where "x" is the number of steps required to move the travel plate 108 between the docked and ready positions and "y" is the number of steps required to move the travel plate 108 between the ready and full travel positions. Preferably, the microcontroller 232 will instruct the motor controller 240 to perform the initial steps at a reduced speed, typically one-third to one-half of the normal operating speed and then ramp up to full speed for the remaining steps. By doing so, the likelihood of damage and/or wear to the connector portions 44, 44a by a reset initiated from the docking position will be minimized.

While forwardly driving the travel plate 108 from its starting position a distance sufficient to reach the full travel position, the microcontroller 232 will determine whether the switch actuating arm 222 has been depressed by the tab 148b of the travel plate 108 to close the zero position detect switch 200 by issuing sequential inquiries to contact KSO2 until receiving, at contact KSI1, an indication that switch 200 is closed. Upon detection of the closure of the zero position detect switch 200 at step 404, the microcontroller 232 instructs the motor controller 240 to ramp down, thereby terminating the forwardly driving stepping of the stepper motor 116 at step 406 and instructs the motor controller 240 to ramp up, now in the rearward direction, until the stepper motor 116 has been rearwardly driven "y" steps to move the travel plate 108 into the ready position. After rearwardly stepping the travel plate 108 into the ready position, the microcontroller 232 updates the display window 68 at step 408 to indicate that the docking station 14 is now ready to dock the notebook computer 12 and the reset procedure is successfully completed at step 410.

Returning to step 404, if the zero position detect switch 200 is not closed after forwardly stepping the travel plate 108 x+y steps, the travel plate 108 is lost and most likely jammed at an unknown position within the docking station 14. In this case, the microcontroller 232 will de-energize the stepper motor 116. The procedure will then continue to step 412 where the microprocessor 232 updates the display window 68 to display a "call service" message and terminates the reset procedure at step 414 to await service of the unit.

Returning now to step 294 of FIG. 26, after the reset of the travel plate is completed, the method by which the electromechanical control system regulates docking of the notebook computer 12 and the docking station 14 continues at step 302 where the docking station 14 waits for the notebook computer 12 to be manually inserted into the rectangular computer opening 60 of the docking station 14 by issuing periodic inquiries to contact KSO3. When the notebook computer 12 is inserted into the docking station 14, the left computer guide rail 28 contacts and depresses the switch actuating portion 194a to close the notebook detect switch 194. Closure of the notebook detect switch 194 is detected by the microcontroller 232 by receipt at contact KSI1 of an indication that the notebook computer 12 has been inserted into the docking station 14. Upon detection of the insertion of the notebook computer 12 into the docking station at step 302, the docking procedure then proceeds to step 304 and awaits securement of the notebook computer 12 to the travel plate 108 by issuing periodic inquiries to contact KSO1. More specifically, as the notebook computer 12 is manually inserted into the docking station, the guide rails 28 align the notebook computer 12 to first close the notebook detect switch 194. As manual insertion of the notebook computer 12 continues, the back computer side 22 engages and rearwardly moves the release plate tab contact 176, thereby pivoting the flipper plate 142 such that the flipper plate tab end portion 152 engages the bottom side 20 of the notebook computer 12 to secure it to the travel plate 108. When the flipper plate tab end portion 152 engages the bottom side 20, the opening of the flipper detect switch 202 is detected by the microcontroller 232 at contact KSI1. As previously discussed, it is important that the notebook computer 12 be powered down when docking with the docking station 14. Accordingly, if the notebook computer 12 is energized during the docking process, the microcontroller 232 will abort the docking process and initiates the ejection of the undocked notebook computer 12. More specifically, after the stepper motor 116 begins to rearwardly drive the travel plate 108 towards the connector portion 44a and before the stepper motor is ramped down to the reduced docking speed, the LED 32a of the notebook computer 12 will become aligned with the photodarlington 192. Once aligned, the microprocessor 232 determines, in accordance with the procedure described above with respect to FIG. 25, whether the notebook computer 12 is energized. If the microcontroller 232 determines, at step 308, that the notebook computer 12 is energized, the procedure continues to steps 310 and 312 where the docking procedure is first aborted by initiating a reset of the travel plate 108, followed by a return to step 302 to await another attempt to dock the notebook computer 12. It should be noted that, as previously discussed, a reset by the travel plate 108 to the full travel position, if initiated while carrying the notebook computer 12, will result in the disengagement of the notebook computer 12 at the full travel position followed by a return of the travel plate 108 to the ready position. When closure of the notebook detect switch 202 is sequentially followed by opening of the flipper detect switch 202, the microcontroller 232 determines that the notebook has been manually inserted into the opening 60 to the full extent possible and initiates mechanized docking of the notebook computer at step 306 by rearwardly stepping the travel plate "y" times to move the travel plate 108 from the ready position to the docked position. Preferably, the stepper motor 16 is controlled such that the stepper motor is first ramped up to full speed and then, when the travel plate is a specified distance from the connector portion 44a, ramped down to approximately one-third to one-half speed, thereby minimizing potential damage and/or wear to the connector portions 44, 44a during physical mating of the two. Detection of any other sequencing of the switches 194, 202 other than that described above, will result in the immediate termination of the docking procedure and reset of the travel plate 108.

Returning to step 308, if the microcontroller 232 determines that the notebook computer 12 is de-energized, the procedure continues to step 314 where, while the travel plate 108 is traveling rearwardly at a reduced speed, the microcontroller 232 commences issuance of periodic inquiries at contact KSOO to determine whether the door plate 38 is open to permit engagement of the connector portions 44, 44a. If the door plate 38 is closed, the microcontroller 232 will receive, at contact KSI1, an indication of closure of I/O door detect switch 198. If closure of the switch 198 is detected, the procedure continues to steps 316 and 318 where the microcontroller 232 aborts the docking procedure by initiating a reset of the travel plate 108 before the connector portion 44a contacts the door plate 38 and returns to step 302 to await another attempt to dock the notebook computer 12. As before, initiation of the reset procedure at this stage will disengage the notebook computer 12 at the full travel position and position the travel plate at the ready position.

Returning to step 314, if the door plate 38 is open to permit engagement of the connector portions 44, 44a, the procedure continues to step 320 where, after the metal plate 216 discharges, via the travel plate 108, any electrostatic charge accumulated by the notebook computer 12 and the travel plate 108 drives the connector portions 44, 44a into contact with each other, the microcontroller 232 issues inquiries at contact KSO6 to determine whether the contact between the connector portions 44, 44a have produced an operative interengagement between the two, thereby indicating that the docking procedure has been completed successfully. More specifically, if the microcontroller 232 detects that the loopback detect circuit 268 between the contacts KS06 and KSI1 remains open despite contact between the connector portions 44, 44a, the microcontroller 232 concludes that the docking procedure has been unsuccessful. Accordingly, at steps 322 and 324, the microcontroller 232 initiates a reset of the travel plate 108 and a return to step 302 to await another docking attempt. If, however, the microcontroller 232 determines at step 322 that the loopback detect circuit 268 has been closed by the interengagement of the connector portions 44, 44a, the microcontroller 232 concludes that the connector portions 44, 44a have been successfully interengaged, thereby providing interconnection between the notebook computer 12, the external peripheral devices 48, 50 and 52 and the docking station drives 72, 74 and 88. The microcontroller 232 then issues an instruction to the display window 68 at step 326 to indicate that docking has been complete. The docking procedure will then conclude successfully at step 328.

Referring next to FIG. 27, the procedure by which the notebook computer 12, now docked with the docking station 14, is ejected from the docking station 14 will now be described in greater detail. The ejection procedure commences at step 350 with the notebook computer 12 docked and ready for ejection, for example, at the completion of a work session. At step 352, an eject press of the on/off/eject switch 68 is awaited. In the present embodiment of the invention, the on/off/eject switch 68 is depressed for more than 1.5 seconds to initiate an ejection of the notebook computer 12. When an ejection is initiated using the on/off/eject switch 68, the microcontroller 232 first issues an inquiry at contact KSO4 whether the door plate 78 is open. If a PCMCIA card had been operatively inserted into the slot 34 of the notebook computer 12 during a work session and left inserted at the end of the session, the PCMCIA card could be damaged by striking the periphery of the cover opening 76 through which the PCMCIA extends. Accordingly, after initiation of an ejection, the microcontroller 232 first determines whether the PCMCIA door detect switch 196 is open. If the microcontroller 232 receives an indication at contact KSI1 that the switch 196 is open, it is determined that the door plate 78 is open and the process proceeds to step 356 where the display window 68 is updated with a message indicating that the PCMCIA door is open.

Continuing to step 358, the process waits for a selected time period, for example, 5 seconds, to provide time for the computer operator to close the door plate 78 and, at step 360, again issues an inquiry to contact KSO4 to determine whether the door plate 78 has since been closed. If the microcontroller 232 receives an indication at contact KSI1 that the door plate 78 is still open, the display window 68 is updated with a message indicating the ejection process has been canceled at step 362 and, at step 364, the ejection process ends without a successful ejection of the notebook computer 12.

If the door plate 78 was closed when the ejection process was initiated or was closed in response to the update window indication that the door plate 78 was open, the microcontroller 232 receives an indication at contact KSI1 that the switch 196 has been closed and the procedure continues to step 366 where the stepper motor 116 steps out a known number of steps sufficient to move the docking tray from the docked position to the ejection/full travel position. After the stepper motor 116 has stepped out the proper number of steps, at step 368, the microcontroller 232 issues an inquiry to contact KS02 as to whether the zero position detect switch 200 has been closed by the notebook computer carrying travel plate 108 being driven to full travel position. If the zero position detect switch 200 has not been closed by the travel plate 108 being driven x+y steps forward from the docked position, the position of the travel plate 108 is indeterminate and a critical error has occurred. For example, if the notebook computer 12 jammed in the computer opening 60 during the ejection process, the motor controller 120 would still would still issue the step instructions but the stepper motor 116 would be unable to move the travel plate 108 forward towards the full travel position. Accordingly, if the microcontroller 232 receives an indication at contact KSI1 that the zero position detect switch 200 is not closed at step 368, the display window 66 is updated at step 370 to display a "call service" message and the ejection process is terminated unsuccessfully at step 372.

If, however, the microcontroller 232 receives an indication at contact KSI1 that the zero position detect switch 290 is closed and the travel plate 108 has reached the zero position, the stepper motor 116 reverses to step the travel plate 108 to the ready position at step 374 and the ejection process concludes successfully at step 376. The notebook computer 12, having been automatically released from engagement with the travel plate 108 in the manner previously described when the travel plate 108 reaches the full travel position, remains in the full travel position for manual removal from the computer opening 66.

The foregoing detailed description is to be clearly understood as being given by way of illustration and example only, the spirit and scope of the present invention being limited solely by the appended claims.

What is claimed is:

1. Computer apparatus comprising:
    a portable computer having first operating components therein;
    a docking station structure having second operating components therein, said docking station structure being configured to support said portable computer in a first manually positioned orientation relative thereto;
    cooperating means carried by said portable computer and said docking station structure and being forcibly interengageable with one another to operably and releasably couple said first and second operating components; and
    motorized drive means carried by said docking station structure and operative to drivingly move the supported portable computer relative to said docking station structure from said first orientation to a second orientation in a manner forcibly interengaging said cooperating means.

2. Computer apparatus comprising:
    a portable computer having first operating components therein;
    a docking station structure having second operating components therein and an opening through which said portable computer may be manually inserted at least partially into the interior of said docking station structure;
    cooperating means carried by said portable computer and said docking station structure and being forcibly interengageable with one another to operably and releasably couple said first and second operating components; and motorized drive means carried by said docking station structure and operative to drivingly translate the manually inserted portable computer within the interior of said docking station structure in a manner forcibly interengaging said cooperating means.

3. Computer apparatus comprising:

a portable computer having first operating components therein;

a docking station structure having second operating components therein and an opening through which said portable computer may be manually inserted, in a first direction, at least partially into the interior of said docking station structure to a receiving position therein;

cooperating means carried by said portable computer and said docking station structure and being forcibly interengageable with one another to operably and releasably couple said first and second operating components; and motorized drive means carried by said docking station structure and selectively operative to:

(1) drivingly translate the manually inserted portable computer relative to said docking station structure, in said first direction, from said receiving position to a docked position in a manner forcibly interengaging said cooperating means, and (2) drivingly translate the manually inserted portable computer relative to said docking station structure, in a second direction opposite from said first direction, from said docked position to an ejection position in which said cooperating means are disengaged from one another.

4. Computer apparatus comprising:

a portable computer having first operating components therein:

a docking station structure having second operating components therein and an opening through which said portable computer may be manually inserted, in a first direction, at least partially into the interior of said docking station structure to a receiving position therein;

cooperating means carried by said portable computer and said docking station structure and being forcibly interengageable with one another to operably and releasably couple said first and second operating components;

motorized drive means carried by said docking station structure and being operable in:

(1) a first mode in which said motorized drive means drivingly translate said portable computer relative to said docking station structure, in said first direction, from said receiving position to a docked position in a manner forcibly interengaging said cooperating means with one another, and (2) a second mode in which said motorized drive means drivingly translate said portable computer relative to said docking station structure, in a second direction opposite from said first direction, to an ejection position in which said cooperating means are disengaged from one another;

first switch means carried by said docking station structure and being manually operable to initiate operation of said motorized drive means in said first mode thereof; and second switch means carried by said docking station structure and being manually operable to initiate operation of said motorized drive means in said second mode thereof.

5. A docking station structure for removably receiving a portable computer having first operating components therein and a connection area through which external operating components may be operatively coupled to the first operating components, said docking station structure comprising:

a housing having second operating components therein and an opening through which the portable computer may be manually inserted at least partially into the interior of said housing;

second operating components disposed in said housing;

connection means supported within said housing in the insertion path of the portable computer, said connection means being operative in response to forcible engagement thereof with the portable computer connection area to operatively and removably couple the first and second operating components; and motorized drive means carried within said housing and operative to translate the manually inserted portable computer relative to said housing in a manner moving the portable computer connection area into forcible engagement with said connection means.

6. A method of electrically coupling first operating components within a portable computer with second operating components in a docking station structure, said method comprising the steps of:

providing said portable computer and said docking station structure with cooperatively interengageable means for electrically coupling said first and second operating components;

manually inserting said portable computer into said docking station structure to a receiving position in which said cooperatively interengageable means are in a spaced apart, facing relationship; and using a motorized portion of said docking station structure to mechanically drive the manually inserted portable computer relative to said docking station structure in a manner forcibly interengaging said cooperatively interengageable means.

7. A method for operatively engaging a portable computer with a docking station, comprising the steps of:

determining whether said portable computer has been manually inserted into a non-operative engagement with said docking station;

determining whether said manually inserted portable computer has been secured, at a first position, in said manually inserted, non-operative engagement with said docking station; and upon determining that said manually inserted portable computer has been secured in said manually inserted, non-operative engagement with said portable computer, mechanically driving said secured portable computer, from said first position, into a second position where said secured portable computer is operatively engaged with said docking station.

8. A computer apparatus comprising:

a portable computer having first operating components;

a docking station structure having second operating components, said docking station structure being configured to receive said portable computer in a first manually positioned orientation relative thereto;

means connected to said portable computer and said docking station structure for cooperatively coupling said first and second operating components; and means including a motor carried by said docking station structure for moving the supported portable computer relative to said docking station structure from said first orientation to a second orientation in a manner interengaging said coupling means.

9. The computer apparatus of claim 8 further including means for detecting whether said portable computer is powered-up.

10. The computer apparatus of claim 9 further including means responsive to said detecting means for aborting the interengaging of said cooperating means.

11. A computer apparatus comprising:

a portable computer having first operating components therein;

a docking station structure having second operating components therein and an opening through which said portable computer may be manually inserted at least partially into the interior of said docking station structure;

means including a motor carried by said portable computer and said docking station structure for coupling said first and second operating components; and means carried by said docking station structure for translating the manually inserted portable computer within the interior of said docking station structure in a manner forcibly interengaging said coupling means.

12. A computer apparatus comprising:

a portable computer having first operating components therein;

a docking station structure having second operating components therein and an opening through which said portable computer may be manually inserted, in a first direction, at least partially into the interior of said docking station structure to a receiving position therein;

means including a motor carried by said portable computer and said docking station structure for cooperatively coupling said first and second operating components; and means carried by said docking station structure and selectively operative for:

(1) drivingly translating the manually inserted portable computer relative to said docking station structure, in said first direction, from said receiving position to a docked position in a manner forcibly interengaging said cooperating means, and (2) drivingly translating the manually inserted portable computer relative to said docking station structure, in a second direction opposite from said first direction, from said docked position to an ejection position in which said cooperating means are disengaged from another.

13. A docking station structure for removably receiving a portable computer having first operating components therein and a connection area through which external operating components may be operatively coupled to the first operating components, said docking station structure comprising:

a housing having second operating components therein and an opening through which the portable computer may be manually inserted at least partially into the interior of said housing;

means supported within said housing in the insertion path of the portable computer, said means being operative in response to forcible engagement thereof with the portable computer connection area for operatively and removably coupling the first and the second operating components; and motorized drive means carried within said housing and operative to translate the manually inserted portable computer relative to said housing in a manner moving the portable computer connection area into forcible engagement with said coupling means.

14. A computer apparatus comprising:

a portable computer having first operating components therein:

a docking station structure having second operating components therein and an opening through which said portable computer may be manually inserted, in a first direction, at least partially into the interior of said docking station structure to a receiving position therein;

means carried by said portable computer and said docking station structure for operably and releasably coupling said first and second operating components;

means including a motor carried by said docking station structure for operating in:

(1) a first mode in which said operating means drivingly translate said portable computer relative to said docking station structure, in said first direction, from said receiving position to a docked position in a manner forcibly interengaging said coupling means with one another, and (2) a second mode in which said operating means drivingly translate said portable computer relative to said docking station structure, in a second direction opposite from said first direction, to an ejection position in which said coupling means are disengaged from one another;

first means carried by said docking station structure for manually initiating operation of said motorized drive means in said first mode thereof; and second means carried by said docking station structure for manually initiating operation of said operating means in said second mode thereof.

15. A computer apparatus comprising:

a portable computer having first operating components therein;

a docking station structure having second operating components therein, said docking station structure being configured to support said portable computer in a first manually positioned orientation relative thereto;

a first mating structure carried by said portable computer and a second mating structure carried by said docking station structure and being interengageable with one another to operably and releasably couple said first and second operating components; and a motor assembly carried by said docking station structure and operative to move the supported portable computer relative to said docking station structure from said first orientation to a second orientation in a manner interengaging said first and second mating structures.

16. The computer apparatus of claim 15, wherein said first mating structure and said second mating structure comprise a mating pin connector structure.

17. A computer apparatus comprising:

a portable computer having first operating components therein;

a docking station structure having second operating components therein and an opening through which said portable computer may be manually inserted at least partially into the interior of said docking station structure;

a first mating structure carried by said portable computer and a second mating structure carried by said docking station structure and being interengageable with one another to operably and releasably couple said first and second operating components; and a motor assembly carried by said docking station structure and operative to drive the manually inserted portable computer within the interior of said docking station structure in a manner interengaging said first and second mating structures.

18. The computer apparatus of claim 17, wherein said first and second mating structures comprise a mating pin connector structure.

19. A computer apparatus comprising:

a portable computer having first operating components therein;

a docking station structure having second operating components therein and an opening through which said portable computer may be manually inserted, in a first direction, at least partially into the interior of said docking station structure to a receiving position therein;

a first mating structure carried by said portable computer and a second mating structure carried by said docking station structure and being interengageable with one another to operably and releasably couple said first and second operating components; and a motor assembly carried by said docking station structure and selectively operative to:

(1) drive the manually inserted portable computer relative to said docking station structure, in said first direction, from said receiving position to a docked position in a manner interengaging said first mating structure and said second mating structure, and (2) drive the manually inserted portable computer relative to said docking station structure, in a second direction opposite from said first direction, from said docked position to an ejection position in which said first mating structure and said second mating structure are disengaged from one another.

20. The computer apparatus of claim 19, wherein said first mating structure and said second mating structure comprise a mating pin connector structure.

21. A computer apparatus comprising:

a portable computer having first operating components therein;

a docking station structure having second operating components therein and an opening through which said portable computer may be manually inserted, in a first direction, at least partially into the interior of said docking station structure to a receiving position therein;

a first mating structure carried by said portable computer and a second mating structure carried by said docking station structure and being interengageable with one another to operably and releasably couple said first and second operating components;

a motor assembly carried by said docking station structure and being operable in:

(1) a first mode in which said motor assembly drives said portable computer relative to said docking station structure, in said first direction, from said receiving position to a docked position in a manner interengaging said first mating structure and said second mating structure with one another, and (2) a second mode in which said motor assembly drives said portable computer relative to said docking station structure, in a second direction opposite from said first direction, to an ejection position in which said first mating structure and said second mating structure are disengaged from one another;

a first switch carried by said docking station structure and being manually operable to initiate operation of said motor assembly in said first mode thereof; and a second switch carried by said docking station structure and being manually operable to initiate operation of said motor assembly in said second mode thereof.

22. The computer apparatus of claim 21 wherein said first mating structure and said second mating structure comprise a mating pin connector structure.

23. A docking station structure for removably receiving a portable computer having first operating components therein and a connection area through which external operating components may be operatively coupled to the first operating components, said docking station structure comprising:

a housing having second operating components therein and an opening through which the portable computer may be manually inserted at least partially into the interior of said housing;

a connector supported within said housing in the insertion path of the portable computer, said connector being operative in response to engagement thereof with the portable computer connection area to operatively and removably couple the first and second operating components; and a motor assembly carried within said housing and operative to translate the manually inserted portable computer relative to said housing in a manner moving the portable computer connection area into engagement with said connector.

24. A computer apparatus comprising:

a portable computer having first operating components;

a docking station structure having second operating components, said docking station structure being configured to receive said portable computer in a first manually positioned orientation relative thereto;

a first connector coupled to said portable computer and a second connector coupled to said docking station structure for cooperatively coupling said first and second operating components; and a motor assembly carried by said docking station structure configured to move the supported portable computer relative to said docking station structure from said first orientation to a second orientation in a manner interengaging said first connector and said second connector.

25. The computer apparatus of claim 24, wherein said first connector and said second connector are electrical connectors.

26. A computer apparatus comprising:

a portable computer having first operating components therein;

a docking station structure having second operating components therein and an opening through which said portable computer may be manually inserted at least partially into the interior of said docking station structure;

a first connector carried by said portable computer and a second connector carried by said docking station structure for coupling said first and second operating components; and a motor assembly carried by said docking station structure configured to translate the manually inserted portable computer within the interior of said docking station structure in a manner interengaging said first connector and said second connector.

27. The computer apparatus of claim 26, wherein said first connector and said second connector are electrical connectors.

28. A computer apparatus comprising:

a portable computer having first operating components therein:

a docking station structure having second operating components therein and an opening through which said portable computer may be manually inserted, in a first direction, at least partially into the interior of said docking station structure to a receiving position therein;

a first connector carried by said portable computer and a second connector carried by said docking station structure for operably and releasably coupling said first and second operating components;

a motor assembly carried by said docking station structure configured to operate in:
  (1) a first mode in which said motor assembly drives said portable computer relative to said docking station structure, in said first direction, from said receiving position to a docked position in a manner interengaging said first connector and said second connector with one another, and
  (2) a second mode in which said motor assembly drives said portable computer relative to said docking station structure, in a second direction opposite from said first direction, to an ejection position in which said first connector and said second connector are disengaged from one another;

a first switch carried by said docking station structure for manually initiating operation of said motor assembly in said first mode thereof; and a second switch carried by said docking station structure for manually initiating operation of said motor assembly in said second mode thereof.

* * * * *